(12) United States Patent
Pedretti

(10) Patent No.: US 12,215,676 B2
(45) Date of Patent: Feb. 4, 2025

(54) LIFT DRIVE SYSTEM FOR ENERGY STORAGE AND DELIVERY SYSTEM

(71) Applicant: Energy Vault, Inc., Westlake Village, CA (US)

(72) Inventor: Andrea Pedretti, Thousand Oaks, CA (US)

(73) Assignee: Energy Vault, Inc., Westlake Village, CA (US)

( * ) Notice: Subject to any disclaimer, the term of this patent is extended or adjusted under 35 U.S.C. 154(b) by 293 days.

(21) Appl. No.: 17/810,819

(22) Filed: Jul. 5, 2022

(65) Prior Publication Data

US 2023/0009666 A1 Jan. 12, 2023

Related U.S. Application Data

(60) Provisional application No. 63/203,070, filed on Jul. 7, 2021.

(51) Int. Cl.
*F03G 3/00* (2006.01)
*H02K 7/10* (2006.01)
*H02K 7/112* (2006.01)

(52) U.S. Cl.
CPC .......... *F03G 3/094* (2021.08); *H02K 7/1004* (2013.01); *H02K 7/112* (2013.01)

(58) Field of Classification Search
CPC ........ D04H 1/4334; D04H 1/56; D04H 1/732; D04H 3/009; D04H 3/03; D04H 3/16; D06M 11/00; D10B 2501/00; D10B 2505/04; F03G 3/094; H02K 7/1004; H02K 7/112; B66B 1/302; B66B 1/34
See application file for complete search history.

(56) References Cited

U.S. PATENT DOCUMENTS

| | | | |
|---|---|---|---|
| 1,720,732 | A | 7/1929 | Jongedyk |
| 1,822,432 | A | 9/1931 | Bradley |
| 2,547,935 | A | 4/1951 | Grabinski |
| 2,627,176 | A | 2/1953 | Levy |
| 2,924,484 | A | 2/1960 | Tolsma |

(Continued)

FOREIGN PATENT DOCUMENTS

| | | |
|---|---|---|
| CL | 199701049 | 5/1997 |
| CL | 201001028 | 9/2010 |

(Continued)

OTHER PUBLICATIONS

FR 2146481 A1—Vogel, all pages—EPO translation (Year: 1972).*

(Continued)

*Primary Examiner* — Naishadh N Desai
(74) *Attorney, Agent, or Firm* — Knobbe Martens Olson & Bear, LLP

(57) ABSTRACT

A lift drive system for an energy storage and delivery system includes an electric motor that rotates a driven shaft, a brake assembly for selectively braking the rotation of the driven shaft, and optionally includes a clutch selectively operable to decouple the electric motor from the driven shaft. A steel ribbon is disposed at least partially about and in contact with the driven shaft, where rotation of the driven shaft by the electric motor causes linear movement of the steel ribbon. The steel ribbon can connect at one end to an elevator cage assembly and at an opposite end to a counterweight.

19 Claims, 21 Drawing Sheets

(56) References Cited

U.S. PATENT DOCUMENTS

| | | |
|---|---|---|
| 3,405,278 A | 10/1968 | Ley |
| 4,018,021 A | 4/1977 | Dow |
| 4,284,899 A | 8/1981 | Bendiks |
| 4,381,839 A | 5/1983 | Engler et al. |
| 4,918,282 A | 4/1990 | Cheek |
| 5,340,218 A | 8/1994 | Cuthbertson |
| 5,888,043 A | 3/1999 | Jatcko |
| 6,282,859 B1 | 9/2001 | Van Der Heijden |
| 6,557,316 B2 | 5/2003 | Van Der Heijden |
| 6,866,815 B2 | 3/2005 | Gohres et al. |
| 6,955,015 B2 | 10/2005 | Manthei |
| 7,191,710 B2 | 3/2007 | Powell |
| 7,561,936 B2 | 7/2009 | Matsufuji |
| 7,712,326 B2 | 5/2010 | Jagusztyn et al. |
| 7,743,609 B1 | 6/2010 | Brostmeyer |
| 7,775,571 B2 | 8/2010 | Waisanen |
| 7,836,646 B2 | 11/2010 | Matsufuji |
| 7,886,537 B2 | 2/2011 | Jagusztyn et al. |
| 7,973,420 B2 | 7/2011 | Scott |
| 8,176,702 B2 | 5/2012 | Adam |
| 8,465,071 B2 | 6/2013 | Risi et al. |
| 8,628,289 B1 | 1/2014 | Benedict |
| 8,667,750 B2 | 3/2014 | Speer |
| 8,674,527 B2 | 3/2014 | Fyke et al. |
| 9,059,605 B2 | 6/2015 | Murray et al. |
| 9,422,108 B2 | 8/2016 | Hognaland |
| 9,523,201 B2 | 12/2016 | Romanenko |
| 9,688,520 B1 | 6/2017 | Khalil |
| 10,683,851 B2 | 6/2020 | Pedretti et al. |
| 10,788,020 B2 | 9/2020 | Pedretti et al. |
| 10,830,216 B2 | 11/2020 | Pedretti et al. |
| 10,837,429 B2 | 11/2020 | Pedretti et al. |
| 10,935,005 B2 | 3/2021 | Bhargava |
| 10,961,051 B1 | 3/2021 | Lindbo et al. |
| 11,011,967 B2 | 5/2021 | Zhang |
| 11,525,437 B2 | 12/2022 | Pedretti et al. |
| 11,555,484 B2 | 1/2023 | Pedretti et al. |
| 11,585,328 B2 | 2/2023 | Pedretti et al. |
| 11,719,229 B2 | 8/2023 | Pedretti et al. |
| 11,746,758 B2 | 9/2023 | Pedretti et al. |
| 11,761,431 B2 | 9/2023 | Pedretti et al. |
| 11,761,432 B2 | 9/2023 | Pedretti |
| 11,820,629 B2 | 11/2023 | Pedretti et al. |
| 11,920,569 B2 | 3/2024 | Pedretti et al. |
| 12,017,687 B2 | 6/2024 | Pedretti et al. |
| 12,037,989 B2 | 7/2024 | Pedretti et al. |
| 12,044,218 B2 | 7/2024 | Pedretti |
| 12,049,874 B2 | 7/2024 | Pedretti et al. |
| 2002/0197135 A1 | 12/2002 | Arntzen et al. |
| 2003/0009970 A1 | 1/2003 | MacDonald et al. |
| 2003/0019828 A1 | 1/2003 | Choi |
| 2003/0214135 A1 | 11/2003 | Peloquin |
| 2003/0215318 A1 | 11/2003 | Buzzoni |
| 2004/0020145 A1 | 2/2004 | Matsufuji |
| 2005/0252144 A1 | 11/2005 | MacDonald et al. |
| 2007/0000246 A1 | 1/2007 | Prastitis |
| 2007/0186502 A1 | 8/2007 | Marsh et al. |
| 2007/0193183 A1 | 8/2007 | Price et al. |
| 2008/0098687 A1 | 5/2008 | Marsh et al. |
| 2009/0077920 A1 | 3/2009 | Korman et al. |
| 2009/0173027 A1 | 7/2009 | Bennett |
| 2009/0193808 A1 | 8/2009 | Fiske |
| 2009/0200814 A1 | 8/2009 | Hellgren |
| 2009/0231123 A1 | 9/2009 | Rowell et al. |
| 2009/0284021 A1 | 11/2009 | Scott |
| 2010/0283263 A1 | 11/2010 | Schilling |
| 2010/0301616 A1 | 12/2010 | Al-Khamis |
| 2011/0027107 A1 | 2/2011 | Bekken |
| 2011/0050158 A1 | 3/2011 | MacDonal et al. |
| 2011/0112731 A1 | 5/2011 | Harada |
| 2011/0123257 A1 | 5/2011 | Mills et al. |
| 2011/0241356 A1 | 10/2011 | Khoshnevis |
| 2012/0272500 A1 | 11/2012 | Reuteler |
| 2012/0306223 A1 | 12/2012 | Karlsson |
| 2013/0125540 A1 | 5/2013 | Vainonen et al. |
| 2014/0110194 A1 | 4/2014 | Zhu et al. |
| 2014/0271240 A1 | 9/2014 | Daily |
| 2015/0048622 A1 | 2/2015 | Schegerin |
| 2015/0130191 A1 | 5/2015 | Houvener et al. |
| 2015/0285037 A1 | 10/2015 | Sadiq |
| 2016/0032586 A1 | 2/2016 | Radford |
| 2016/0138572 A1 | 5/2016 | Boone |
| 2017/0030069 A1 | 2/2017 | Radford |
| 2017/0288457 A1 | 10/2017 | Peitzke et al. |
| 2018/0010582 A1 | 1/2018 | Aranovich et al. |
| 2020/0028379 A1 | 1/2020 | Pedretti |
| 2020/0109703 A1 | 4/2020 | Bhargava |
| 2020/0290804 A1 | 9/2020 | Fjeldheim |
| 2021/0188549 A1 | 6/2021 | Fjeldheim et al. |
| 2021/0198039 A1 | 7/2021 | Salichs et al. |
| 2021/0214100 A1 | 7/2021 | Thayer |
| 2021/0214199 A1 | 7/2021 | Austrheim |
| 2021/0221618 A1 | 7/2021 | Austrheim |
| 2021/0387769 A1 | 12/2021 | Austrheim et al. |
| 2021/0404447 A1 | 12/2021 | Pedretti et al. |
| 2021/0404448 A1 | 12/2021 | Pedretti et al. |
| 2022/0002076 A1 | 1/2022 | Austrheim |
| 2022/0002077 A1 | 1/2022 | Austrheim et al. |
| 2022/0041372 A1 | 2/2022 | Austrheim |
| 2022/0073279 A1 | 3/2022 | Austrheim et al. |
| 2022/0097967 A1 | 3/2022 | Austrheim |
| 2022/0161662 A1 | 5/2022 | Fjeldheim |

FOREIGN PATENT DOCUMENTS

| | | |
|---|---|---|
| CL | 201200123 | 1/2012 |
| CL | 63805 | 1/2020 |
| CL | 202103505 | 12/2021 |
| CN | 1671929 A | 9/2005 |
| CN | 101782049 | 7/2010 |
| CN | 10980946 A | 2/2011 |
| CN | 103 334 887 A | 10/2013 |
| CN | 203404028 U | 1/2014 |
| CN | 103867408 A | 6/2014 |
| CN | 204096953 U | 1/2015 |
| CN | 107628554 A | 1/2018 |
| CN | 110578662 A | 12/2019 |
| CN | 111 692 055 A | 9/2020 |
| CN | 113 460 841 A | 10/2021 |
| CN | 114183317 A | 3/2022 |
| DE | 2152879 A1 | 4/1973 |
| DE | 1279906 | 10/1986 |
| DE | 100 37 678 A1 | 2/2002 |
| DE | 102010014342 A1 | 10/2011 |
| DE | 102011119116 A1 | 5/2013 |
| DE | 202012102937 U1 | 11/2013 |
| EA | 27072 B1 | 6/2017 |
| FR | 1 135 656 | 5/1957 |
| FR | 2146481 A1 * | 7/1972 |
| FR | 2 812 865 A1 | 2/2002 |
| FR | 3099212 A1 | 1/2021 |
| GB | 946 930 A | 1/1964 |
| GB | 2351066 A | 12/2000 |
| GB | 2 578 805 A | 5/2020 |
| GB | 2585124 A | 12/2020 |
| JP | S648197 A | 1/1989 |
| JP | H05-233923 | 9/1993 |
| JP | 06193553 | 7/1994 |
| JP | 2001-163574 A | 6/2001 |
| JP | 2006022529 A | 1/2006 |
| JP | 2009-242088 | 10/2009 |
| KR | 10-0570880 B1 | 4/2006 |
| KR | 10-2009-0110891 A | 10/2009 |
| RU | 2026252 C1 | 1/1995 |
| RU | 2585132 C2 | 5/2016 |
| SU | 481528 A1 | 8/1975 |
| WO | WO 1992018415 A1 | 10/1992 |
| WO | WO 2013/005056 A1 | 10/2013 |
| WO | WO 2015/039534 A1 | 3/2015 |
| WO | WO 2015039505 A1 | 3/2015 |
| WO | WO 2018/184868 A2 | 10/2018 |
| WO | WO 2020/018329 A1 | 1/2020 |
| WO | WO 2020/040717 A1 | 2/2020 |
| WO | WO 2020/169474 A1 | 8/2020 |

(56) References Cited

FOREIGN PATENT DOCUMENTS

| WO | WO 2021/255763 A1 | 12/2021 |
| WO | WO 2021/260450 A1 | 12/2021 |
| WO | WO 2022/006584 A1 | 1/2022 |
| WO | WO 2022/140764 A1 | 6/2022 |

OTHER PUBLICATIONS

"A Weighting game," International Water Power & Dam Construction, Apr. 13, 2010, 8 pages.
Wood, Bruce; "Hanging Tomato Plants"; Mar. 4, 2009; retrieved May 9, 2013 using Internet Archive to view rubberingot.com.
International Search Report and Written Opinion dated Nov. 9, 2022, received in International Patent Application No. PCT/US2022/036244, in 38 pages.

* cited by examiner

LIFT DRIVE SYSTEM FOR ENERGY STORAGE AND DELIVERY SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 and should be considered a part of this specification.

BACKGROUND

Field

The invention is directed to an energy storage and delivery system, and more particularly to a lift drive system for an energy storage and delivery system that stores and releases energy via the vertical movement of blocks or bricks.

Description of the Related Art

Power generation from renewable energy sources (e.g., solar power, wind power, hydroelectric power, biomass, etc.) continues to grow. However, many of these renewable energy sources (e.g., solar power, wind power) are intermittent an unpredictable, limiting the amount of electricity that can be delivered to the grid from intermittent renewable energy sources.

SUMMARY

Accordingly, there is a need for improved system to capture electricity generated by renewable energy sources for predictable delivery to the electrical grid. As used herein, the electrical grid is an interconnected network for delivery of electricity from producers to consumers and spans a large geographical region, including cities, states and/or countries.

In accordance with one aspect of the disclosure, an energy storage and delivery system is provided. An example energy storage and delivery system includes a crane or elevator and a plurality of blocks, where the crane or elevator is operable to move one or more blocks from a lower elevation to a higher elevation to store energy (e.g., via the potential energy of the block in the higher elevation) and operable to move one or more blocks from a higher elevation to a lower elevation to generate electricity (e.g., via the kinetic energy of the block when moved to the lower elevation).

In accordance with another aspect of the disclosure, the energy storage and delivery system can in one example store solar power to produce off-hours electricity. The energy storage and delivery system can move a plurality of blocks from a lower elevation to a higher elevation to store solar energy as potential energy in the blocks during daylight hours when solar electricity is abundant. The energy storage system can then operate to move the blocks from the higher elevation to a lower elevation during nighttime to drive a generator to produce electricity for delivery to the power grid.

In accordance with another aspect of the disclosure, a lift drive system for an energy storage and delivery system is provided. The system comprises an electric motor having an output shaft, a clutch coupled to the output shaft, and a driven shaft coupled to the clutch. The system also comprises a steel ribbon disposed at least partially about and in contact with the driven shaft, rotation of the driven shaft causing the steel ribbon to translate. The system also comprises a brake assembly operatively coupled to the driven shaft and selectively operable to brake a rotation of the driven shaft. When the clutch is engaged, rotation of the output shaft rotates the driven shaft in a first direction to translate the steel ribbon, and when the clutch is disengaged, rotation of the output shaft does not rotate the driven shaft and the brake assembly is engaged to maintain a position of the driven shaft and the steel ribbon.

In accordance with another aspect of the disclosure, a lift drive system for an energy storage and delivery system is provided. The system comprises one or more lift drive units. Each unit comprises an electric motor coupled to a driven shaft and operable to rotate the driven shaft, a steel ribbon disposed at least partially about and in contact with the driven shaft, rotation of the driven shaft causing the steel ribbon to translate, a brake assembly operatively coupled to the driven shaft and selectively operable to brake a rotation of the driven shaft, a clutch coupled to the driven shaft, the brake assembly disposed between the clutch and the electric motor, and a roller coupled to the clutch, the clutch disposed between the brake assembly and the roller, the electric motor, brake assembly, clutch and roller arranged in-line. The system also comprises a drive shaft offset from the roller and coupled to the roller by a belt so that rotation of the drive shaft causes rotation of the roller in a same direction via the belt, and a second electric motor coupled to the drive shaft and operable to rotate the drive shaft. When the clutch is engaged, the brake assembly disengaged and the electric motor off, rotation of the drive shaft by the second electric motor causes rotation of the roller and the driven shaft in a first direction to translate the steel ribbon, and when the clutch is disengaged, rotation of the drive shaft does not rotate the driven shaft and the brake assembly is engaged to maintain a position of the driven shaft and the steel ribbon.

In accordance with another aspect of the disclosure, a lift drive system for an energy storage and delivery system is provided. The system comprises one or more lift drive units. Each lift drive unit comprises an electric motor coupled to a driven shaft, a variable frequency drive operatively coupled to the electric motor, a steel ribbon disposed at least partially about and in contact with the driven shaft, rotation of the driven shaft by the electric motor causing the steel ribbon to translate, and a brake assembly operatively coupled to the driven shaft and selectively operable to brake a rotation of the driven shaft. When the brake assembly is disengaged, rotation of the driven shaft by the electric motor in a first direction causes a linear movement of the steel ribbon in one direction, and wherein rotation of the driven shaft by the electric motor in a second direction opposite the first direction causes a linear movement of the steel ribbon in an opposite direction, and wherein when the brake assembly is engaged a position of the driven shaft and the steel ribbon is maintained.

Further details of energy storage system and method can be found in U.S. application Ser. No. 17/304,980 filed on Jun. 29, 2021, the entirety of which incorporated herein by reference and should be considered a part of this specification.

DETAILED DESCRIPTION

Disclosed below is a lift drive system for an energy storage and delivery system operable to convert electricity into potential energy, and generate electricity from the potential energy when electricity is in demand. The energy storage and delivery system can be operatively coupled to the electrical grid for stabilizing the electrical grid and delivering electricity for residential, commercial, and/or industrial consumers.

Figure 1:
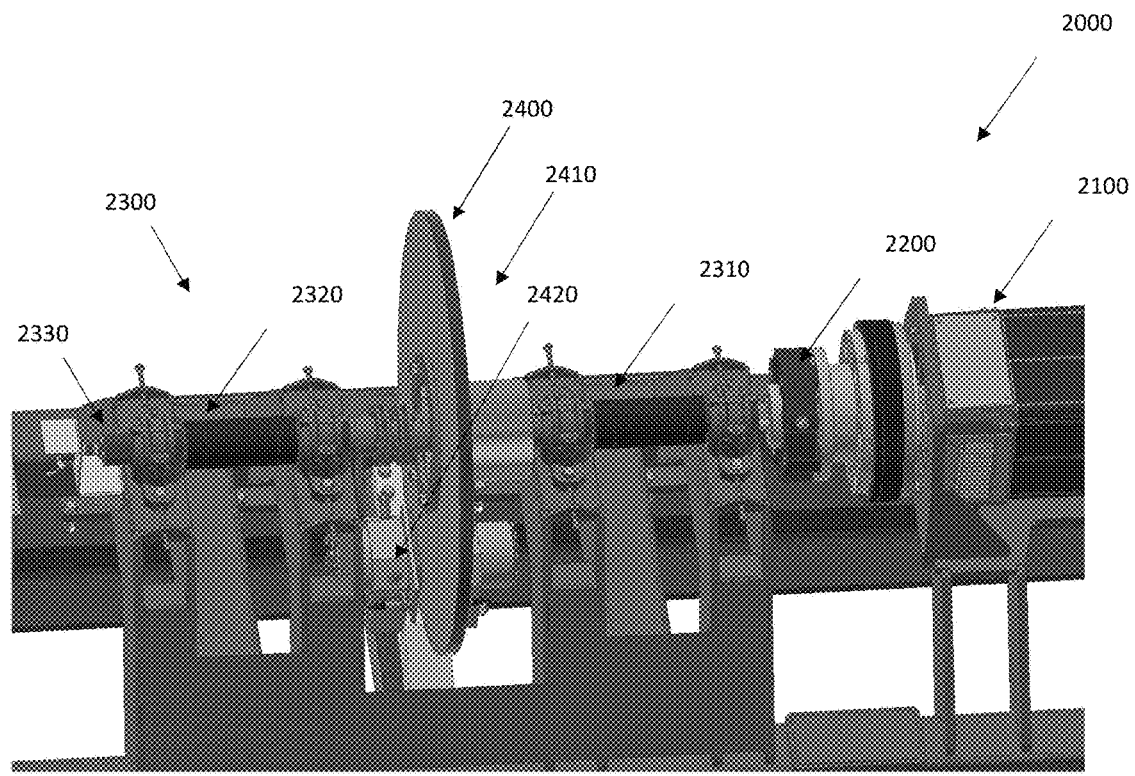
FIG. 1 is a schematic perspective view of a portion of a lift drive system for an energy storage and delivery system for storing energy and generating electricity on demand.
Figure 2:
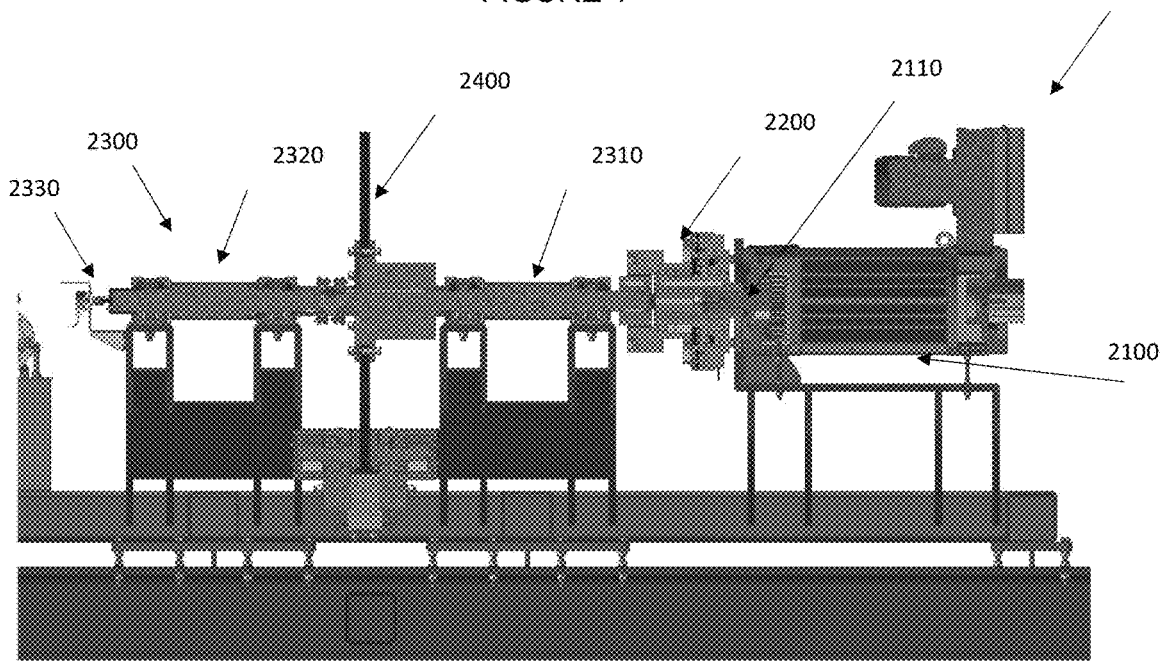
FIG. 2 is a schematic side view of a portion of the lift drive system.
Figure 3:
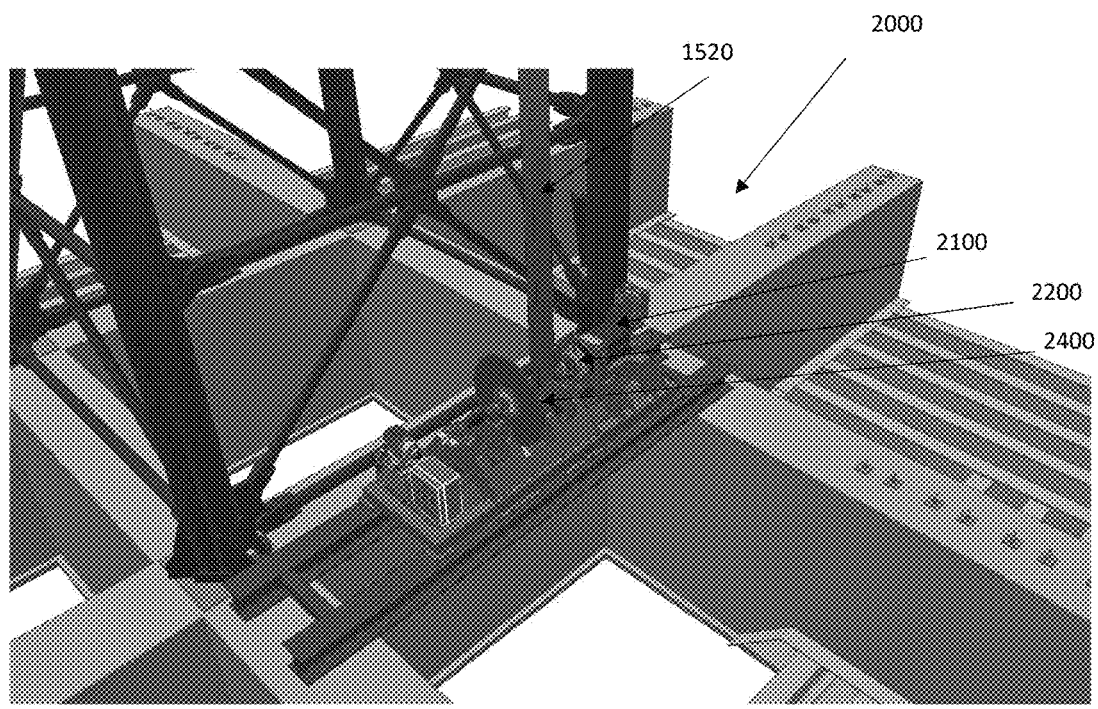
FIG. 3 is a schematic perspective view of a portion of a lift drive system.
Figure 4:
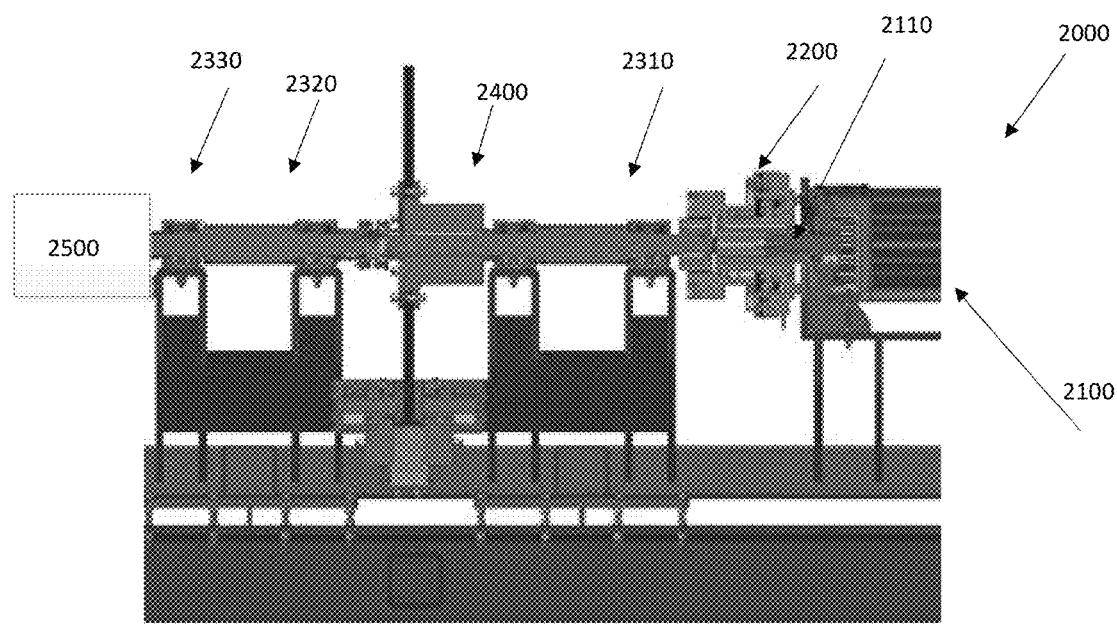
FIG. 4 is a schematic side view of a portion of a lift drive system

FIG. 1-4 show a portion of a lift drive system 2000 for use in a tower system (e.g., tower 1100 of U.S. application Ser. No. 17/304,980, incorporated herein by reference). The system 2000 includes an electric motor 2100 with an output shaft 2110 (e.g., drive shaft) attached to a clutch 2200. A shaft 2300 (e.g., driven shaft) is coupled to an opposite end of the clutch 2200, so that the clutch 2200 is between the motor 2100 and the shaft 2300. The shaft 2300 has a first portion 2310 and a second portion 2320. In one implementation, a brake assembly 2400 is coupled to the shaft 2300. For example, the brake assembly 2400 can be at least partially disposed between the first and second portions 2310, 2320 of the shaft 2300. In one implementation, the brake assembly 2400 includes a brake disc 2410 mounted about the shaft 2300 between the first and second portions 2310, 2320, and a brake pad mechanism 2420 disposed on both sides of the disc 2410 and operable to selectively engage the disc 2410 to frictionally engage the disc 2410 to inhibit (e.g., prevent) rotation of the disc 2410 and therefore rotation of the shaft 2300 and to selectively disengage from the disc 2410 to permit rotation of the disc 2410 and therefore rotation of the shaft 2300 unimpeded. With reference to FIG. 4, an end 2330 of the shaft 2300 can be coupled to an electric motor 2500, further described below. In one implementation, the electric motor 2500 can be a 50 kW motor and can be an asynchronous motor. In one implementation, the electric motor 2100 can be an 800 kW to 1000 kW motor and can be a synchronous motor. Though FIGS. 1-7 show the lift drive system 2000 disposed on a bottom of a tower and steel ribbons extending upward therefrom, one of skill in the art will recognize that the lift drive system 2000 can be mounted on a top of a tower (e.g., tower 1100 of U.S. application Ser. No. 17/304,980) and the steel ribbons extending downward therefrom.

As shown in FIG. 3, a ribbon 1520 can extend about the shaft 2300, for example about the first portion 2310 of the shaft 2300 (e.g., the ribbon 1520 can directly contact the shaft 2300). In one implementation, the shaft 2300 (e.g., first and second portions 2310, 2320) have a coating (e.g., polyurethane) that provides a good friction coefficient for engagement with the ribbons 1520. The ribbon 1520 is not coated (e.g., not embedded in polyurethane). Though not shown, a ribbon 1520 can also extend about the second portion 2320 of the shaft 2300. The ribbon 1520 can be made of metal (e.g., steel). In one implementation, the ribbon 1520 can be made of steel and have a thickness of approximately 0.3 mm, and a width of approximately 200-500 mm. The ribbon 1520 can directly engage the shaft 2300 (e.g., engage the first and/or second shaft portions 2310, 2320). Optionally, the first and second portions 2310, 2320 of the shaft 2300 are coated with polyurethane, and provide for a suitable frictional engagement with the ribbon 1520 (e.g., suitable coefficient of friction). The ribbon 1520 can be flat when laid linearly (e.g., have a generally rectangular cross-section).

Figure 5:
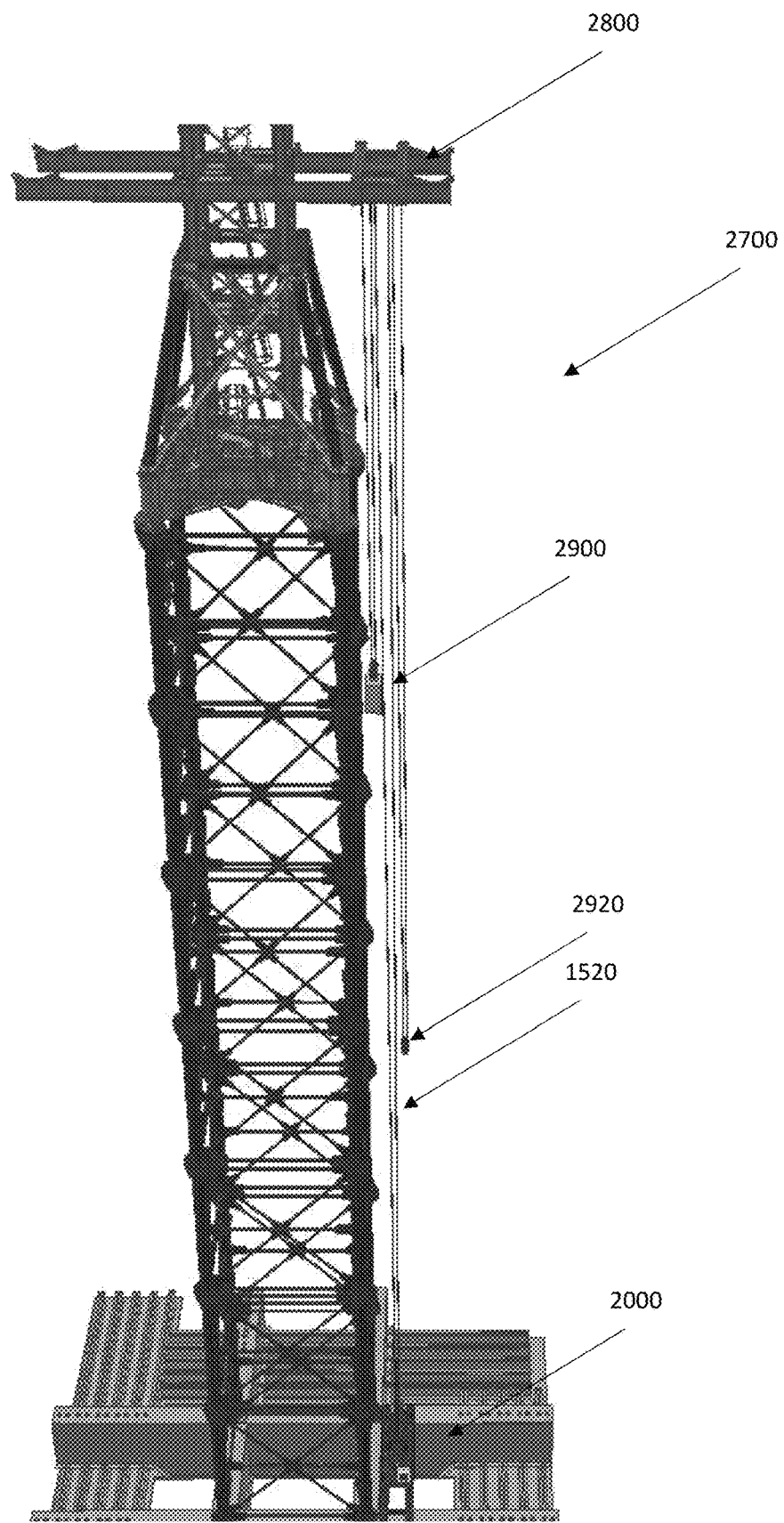
FIG. 5 is a schematic perspective view of an example crane system implementing the lift drive system.

FIG. 5 shows an example tower 2700 that incorporates the lift drive system 2000. The one or more ribbons 1520 extend between the shaft 2300 (e.g., extend about at least a portion of the first and/or second portions 2310, 2320) and roller assembly 2800 at a top of the tower 2700. With continued reference to FIG. 5 and FIG. 6, the ribbons 1520 (e.g., steel ribbons) can be attached to the roller assembly 2800 at an end 2820 and extend to the cabin 2900 or counterweight 2920 (e.g., extend about a shaft of the cabin 2900 or counterweight 2920) and return to and extend over at least a portion of rollers 2810 of the roller assembly 2800. Thereafter, the ribbons 1520 can return in the other direction and extend to and about the shaft 2300 (e.g., extend about the first portion 2310). Though FIG. 6 only shows ribbons 1520 extending about one set (set A) of rollers 2810, one of skill in the art will recognize that ribbons 1520 can also extend about the other set (set B) of rollers 2810 in FIG. 6 and extend in a similar manner as described above, so that at least a portion of the ribbon 1520 extends about the shaft 2300 (e.g. extends about the second portion 2320). The two sets of ribbons 1520 can used to attach to the cabin 2900 and counterweight 2920. For example, with respect to FIG. 13 in U.S. application Ser. No. 17/304,980, which is incorporated herein by reference, the two sets of ribbons 1520 can extend about at least a portion of the proximal beams 1430' of the elevator cage 1400' to support the weight of the elevator cage 1400'.

Figure 6:
FIG. 6 is a schematic perspective view of a portion of the lift drive system.
Figure 6A:
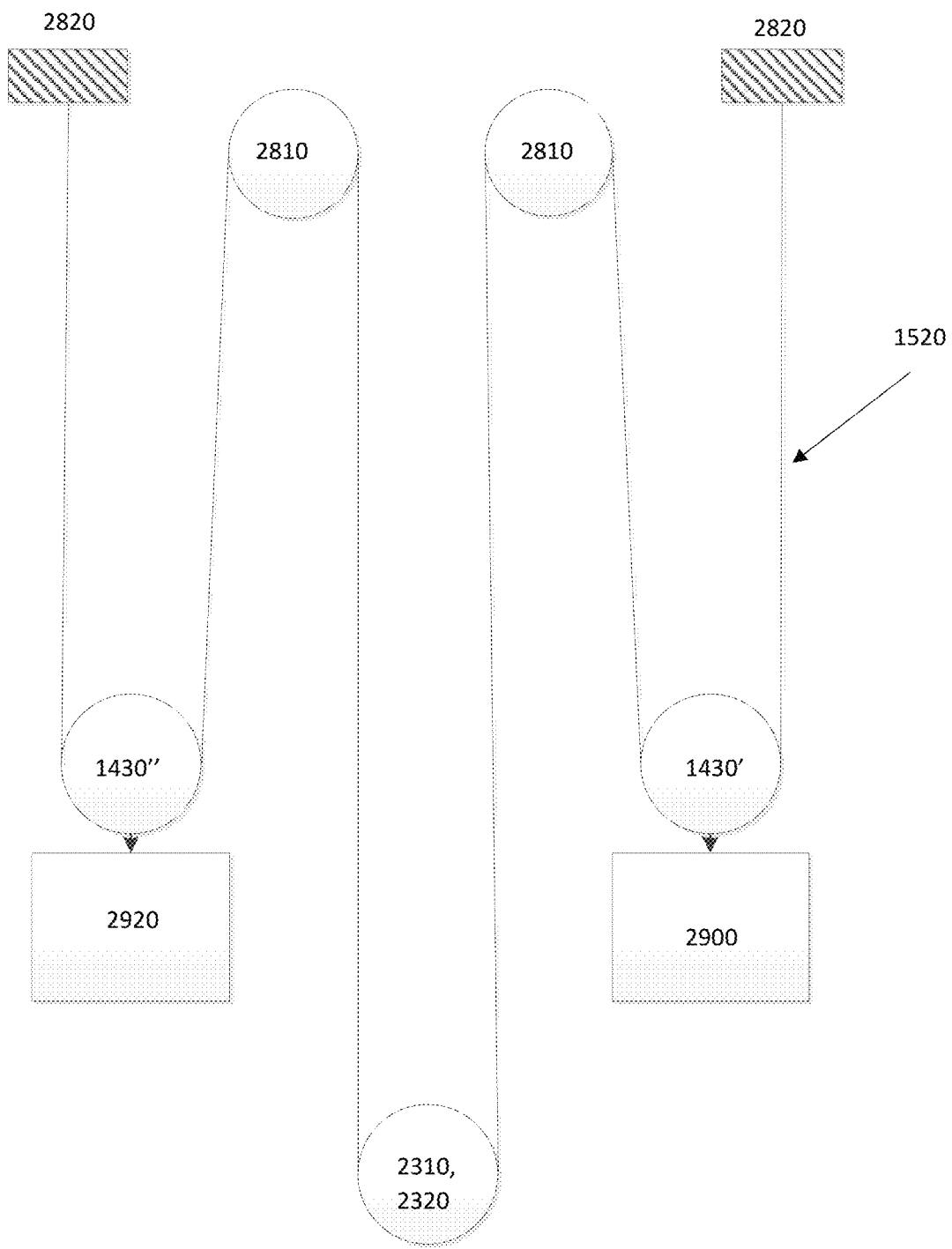
FIG. 6A is a schematic view of the lift drive system.

FIG. 6A shows a schematic representation of the routing of ribbons (e.g., steel ribbons) 1520 about the first and second portions 2310, 2320 of the shaft 2300, the rollers 2810, the proximal beams 1430', 1430" for the cabin 2900 and counterweight 2920, respectively, ending at ends 2820. As discussed in more detail below, the shaft 2300 will only rotate in one direction (e.g., clockwise in FIG. 6A) because the motor 2100 can be a synchronous motor constantly operating on power from the electrical grid. Rotation of the shaft 2300 causes the ribbon 1520 to move to the left, causing the cabin 2900 to be raised and the counterweight 2920 to be lowered. The system 2000 in FIG. 6A has the motor 2100 and shaft 2300 on the ground and ends 2820 at an upper elevation (e.g. the top) of the tower or frame. However, one of skill in the art will recognize that the lift drive system 2000 can be implemented with the motor 2100 at the top of the tower or frame as further described below; in such an implementation, the ribbon 1520 extends on opposite sides of the shaft 2300 so that the ribbon 1520 on one side connects to the cabin and the ribbon 1520 on the opposite side connects the counterweight. In one implementation, the cabin 2900 can weigh approximately the same as the counterweight 2920. For example, both the cabin 2900 and the counterweight 2920 can each weigh approximately 10 tons. In one implementation, each block that can be lifted by the cabin 2900 can weigh more than the cabin 2900. For example, the block can weigh approximately 30 tons.

In one implementation, a fine tune adjustment mechanism (e.g., a hydraulic system) can be attached to the end 2820 of the ribbons 1520, and can provide fine tune adjustment of the position of the elevator cage assembly 1400, for example by adjusting a position of the end 2820 of the ribbon 1520. Such a fine tune adjustment mechanism can be used, for example, to compensate for elongation of the steel ribbon 1520 during use or to compensate for misalignment between the elevator cage assembly 1400 and a floor or level of the tower or frame where the block is going to be picked up from or delivered to.

Figure 7:
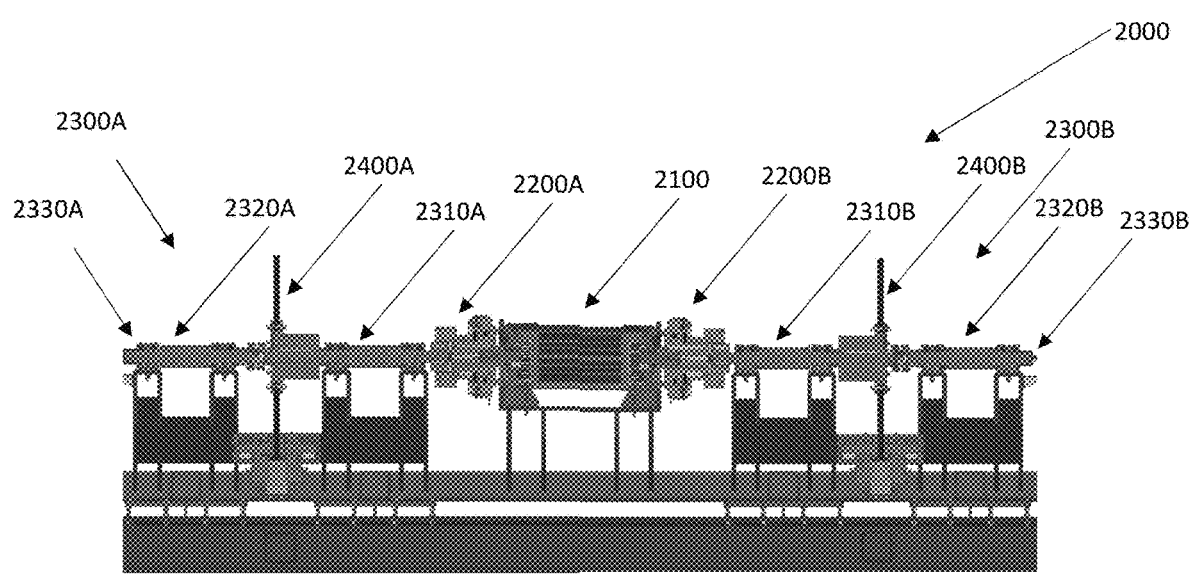
FIG. 7 is a schematic side view of a portion of a lift drive system.
Figure 8:
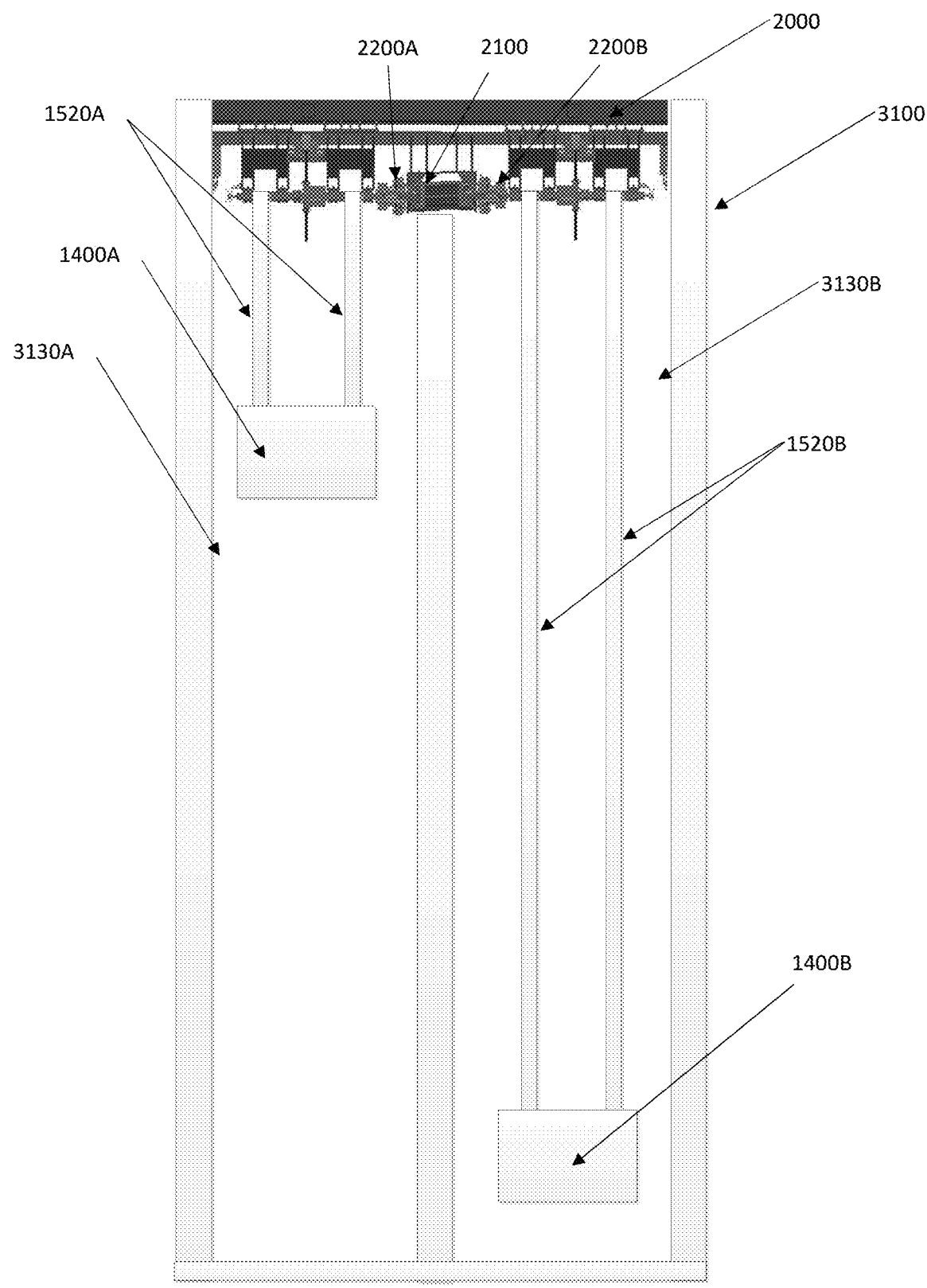
FIG. 8 is a schematic side view of a lift drive system on a tower that is operable to lift blocks in adjacent elevator shafts.

FIG. 7 shows an implementation of the lift drive system 2000 and FIG. 8 shows the lift drive system of FIG. 7 on top of a tower or frame 3100. With reference to FIG. 7, the electric motor 2100 has two output shafts (not shown) that couple to two clutches 2200A, 2200B on opposite sides of the motor 2100, which couple to shafts 2300A, 2300B that have first shaft portions 2310A, 2310B and second shaft portions 2320A, 2320B, with brake assembly 2400A, 2400B interposed between the first shaft portions 2310A, 2310B and second shaft portions 2320A, 2320B. The shafts 2300A, 2300B have end portions 2330A, 2330B. Though not shown, electric motors similar to electric motor 2500 can be operably coupled with each of the end portions 2330A, 2330B.

With reference to FIG. 8, steel ribbons 1520A can extend at least partially about the first and second portions 2310A, 2320A and operably couple to a cabin 1400A that travels within an elevator shaft 3130A of the frame or tower 3100. Steel ribbons 1520B can extend at least partially about the first and second portions 2310B, 2320B and operably couple to a cabin 1400B that travels within an elevator shaft 3130B of the frame or tower 3100. Though not shown, the portions of the ribbons 1520A, 1520B that extend over and first shaft portions 2310A, 2310B and second shaft portions 2320A, 2320B connect to counterweights, in a similar manner as they connect to the counterweight 2920 in FIG. 5.

With reference to FIGS. 7-8, in operation, the electric motor 2100 can be connected to the electrical grid and constantly operated on grid power. The shafts 2110 of the motor 2100 rotate only in one direction. FIG. 8 shows the cabin 1400B in a lower elevation of the tower 3100 and cabin 1400A in a higher elevation of the tower 3100. The cabin 1400B is maintained in the lower elevation (e.g., to pick up a block to move to a higher elevation) by disengaging the clutch 2200B from the motor 2100 and engaging the brake 2400B to maintain the cabin 1400B in a vertical position. Once the cabin 1400B is ready to be lifted, the clutch 2200B is gradually engaged and the brake 2400B gradually disengaged, until the clutch 2200B is fully engaged (e.g., open), allowing the rotation of the shaft 2110 of the motor 2100 to rotate the shaft 2300B to lift the cabin 1400B (e.g., by having the steel ribbon 1520B pulled up and over the first and second portions 2310B, 2320B. As the cabin 1400B is raised, the counterweight (not shown) that is operatively coupled to the other side of the steel ribbons 1520B is lowered. Once the cabin 1400B reaches the desired higher elevation of the tower 3100, the clutch 2200B is disengaged and the brake 2400B engaged, allowing the block to be removed from the cabin 1400B. Once the block has been removed from the cabin 1400B and the cabin 1400B is ready to be lowered, it can be lowered in the same manner described below for lowering the cabin 1400A.

With continued reference to FIG. 8, while the cabin 1400B is ready to be raised, the cabin 1400A is at the higher elevation ready to be lowered. At this higher location, the clutch 2200A has been disengaged and the brake 2400A engaged to allow a block to be removed from the cabin 1400A. Once the cabin 1400A is empty, the brake 2400A is disengaged and the clutch 2200A remains disengaged, and the motor 2500 attached to the end 2330A of the shaft 2300A rotates the shaft 2300A in the opposite direction to quickly lower the cabin 1400A to the lower elevation to pick up another block. The motor 2500 can operate with a variable frequency drive to accurately position the cabin 1400A when lowered. Once the block has been loaded onto the cabin 1400A and the cabin 1400A is ready to be raised, it can be raised in the same manner described above for raising the cabin 1400B.

In the manner described above, one of the clutches 2200A, 2200B is always engaged and the other of the clutches 2200B, 2200A is always disengaged, and one of the cabins 1400A, 1400B is being raised while the other of the cabins 1400B, 1400A is being lowered. Therefore, power continuity is achieved by releasing one clutch (e.g., once a block has been raised and its cabin is ready to be lowered) and engaging another clutch (e.g., once a block has been loaded onto a cabin and ready to be raised). Advantageously, the motor 2100 constantly operates on electrical grid power and does not utilize gear boxes or power electronics, thereby making the lift system 2000 less complex and less costly. Additionally, while the motor 2100 is constantly operating on electrical grid power, when it is not lifting a load the cost of electricity is relatively small.

To lower blocks from the higher elevation to the lower elevation of the tower 3100 to generate and delivery electricity, a modification of the process described above for lowering the cabin 1400A is used. The circuitry of the asynchronous motor 2500 is opened, and the brake 2400A is released and the motor 2500 allowed to spin in the opposite direction and generated electricity can be transferred to the electrical grid. Once the cabin 1400A reaches the lower elevation, the brake 2400A is engaged.

Figure 9:
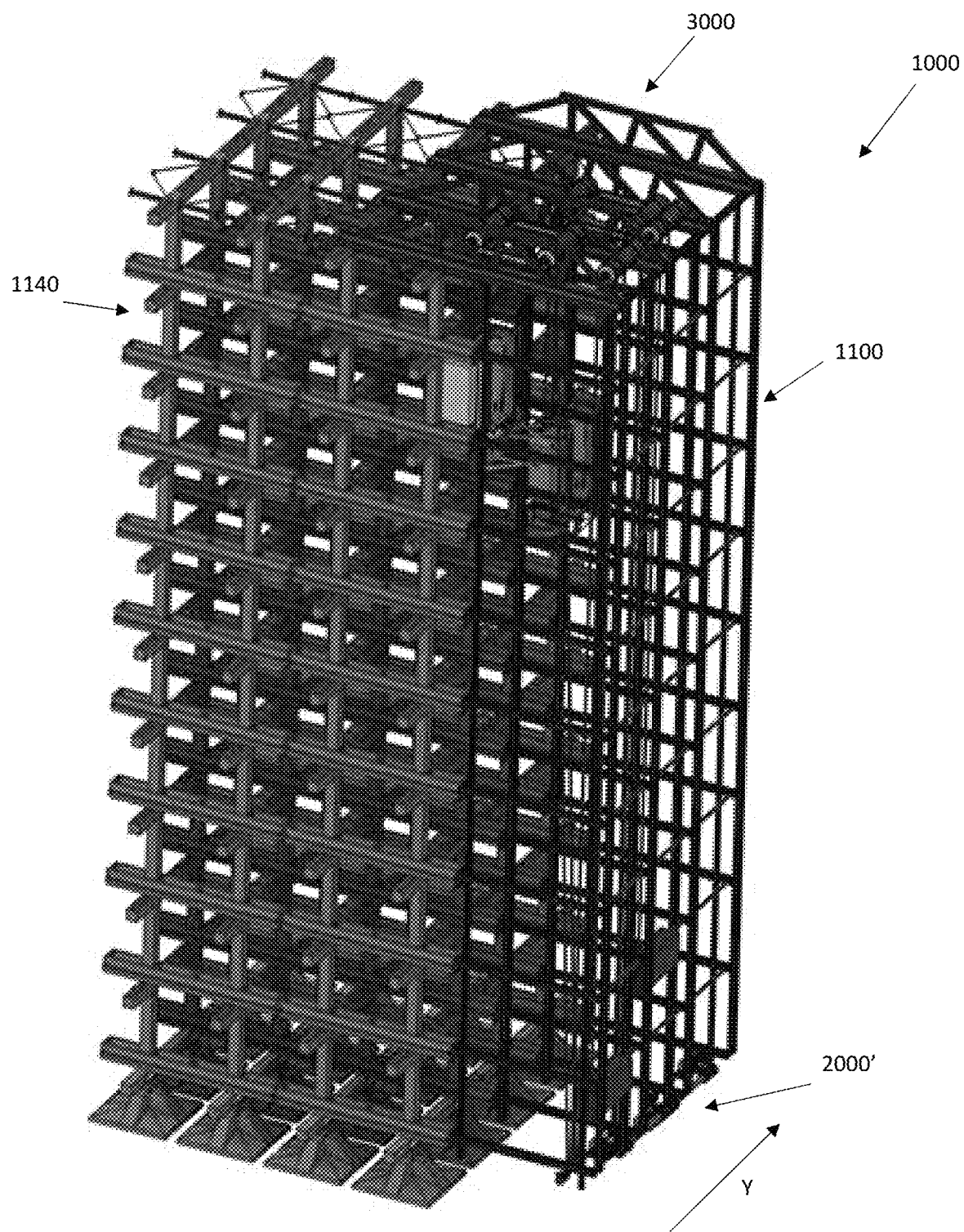
FIG. 9 is a schematic perspective view of a tower or frame with a lift drive system operable to move blocks between different levels of the tower.
Figure 10:
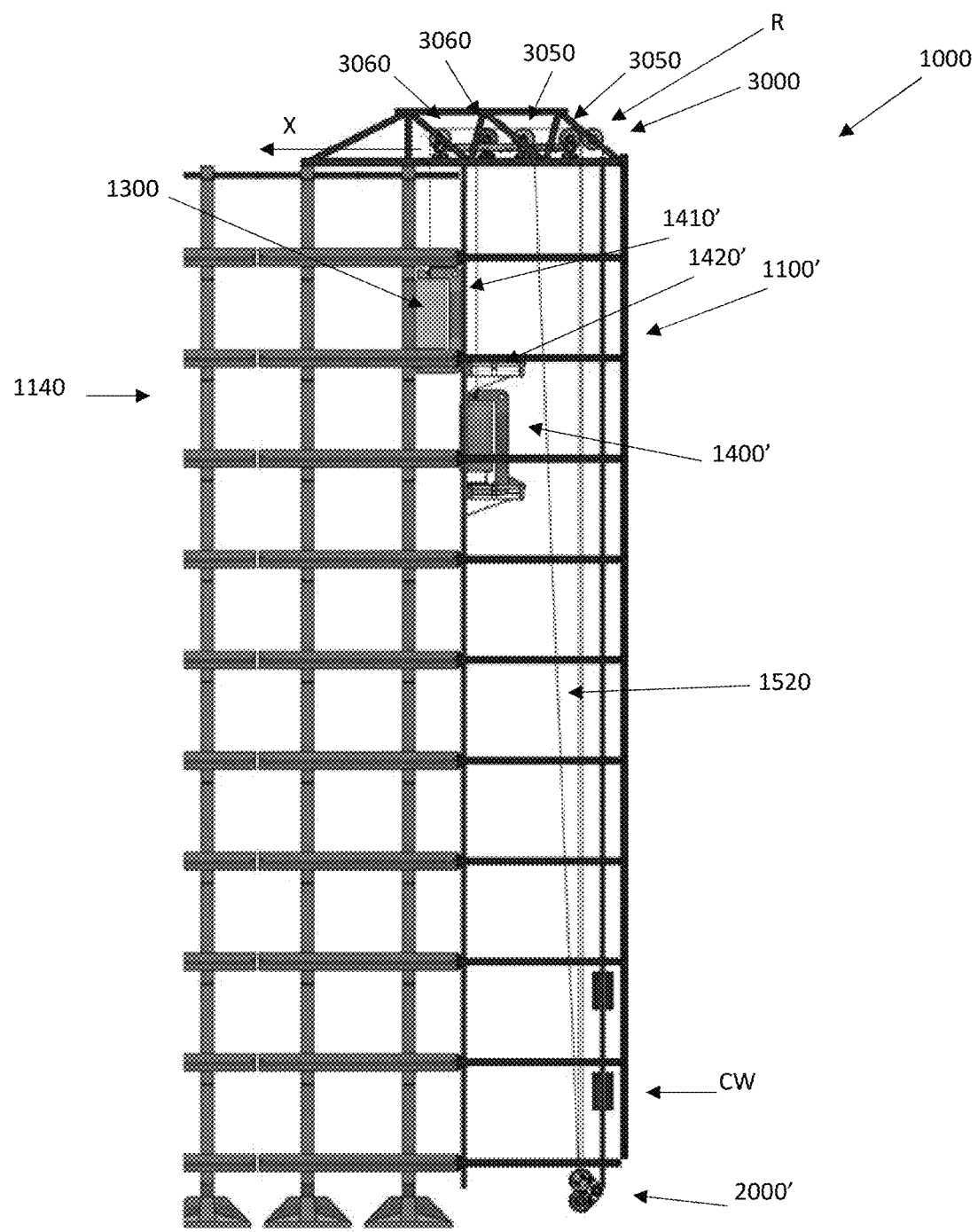
FIG. 10 is a schematic side view of the tower or frame with the lift drive system of FIG. 9.

FIGS. 9-10 show an implementation of the energy storage and delivery system 1000 for moving blocks 1300 (e.g., in a Z or vertical direction) between different rows or floors 1140 of a frame or tower 1100 of the system 1000 with an elevator cage assembly 1400'. The frame or tower 1100 has multiple modules in the depth (or Y) direction (e.g., 3 modules, 12 modules, etc.). Each module can have multiple columns and rows or floors 1140.

In the illustrated implementation, a trolley 3000 is disposed on top of the frame or tower 1100 and can selectively move (e.g., be actuated to move) laterally (e.g., in an X or horizontal direction), along rails or tracks on top of the frame or tower 1100 by an actuator (e.g., linear actuator). The elevator cage assembly 1400' is connected to one or more cables or ribbons 1520 (e.g., one or more, for example multiple, steel ribbons) that extend from the elevator cage assembly 1400', over rollers 3050, 3060 of the trolley 3000 and toward the lift drive system 2000'.

The cable(s) or ribbon(s) 1520 extend over one or more rollers or pulleys of the lift drive system 2000' toward and over a roller R at the top of the tower 1100 and then extend down to the counterweight CW. The cable(s) or ribbons 1520 used with the lift drive system 2000' can be the same as the cables or ribbons 1520 described above for use with the lift drive system 2000 in FIGS. 1-8. As shown in FIGS. 9-10, the lift drive system 2000' is located at a bottom portion (e.g., at or below a bottom row or floor 1140) of the frame or tower 1100.

The lift drive system 2000' is similar to the lift drive system 2000 in FIGS. 1-4 and 7 (e.g., has the same components). Therefore, the reference numerals used to designate the various components of the lift drive system 2000' are identical to those used for identifying the corresponding components of the lift drive system 2000 in FIGS. 1-4 and 7, except that a "'" has been added to the numerical identifier. Therefore, the structure and description for the various features of the lift drive system 2000 and how it's operated and controlled are understood to also apply to the corresponding features of the lift drive system 2000' in FIGS. 9-10, except as described below.

The elevator cage assembly 1400' can have an elevator cage 1410' that moves laterally relative to the base 1420' (e.g., to pick up a block 1300 from a floor 1140 or deliver a block 1300 to a floor 1140). The elevator cage assembly 1400' moves up and down along the tower 1100 via the lift drive system 2000' that moves (e.g., translates) the cable(s) or ribbon(s) 1520 (e.g., to cause the raising of the elevator cage assembly 1400' and the lowering of the counterweight CW or to cause the lowering of the elevator cage assembly 1400' and the raising of the counterweight CW). Advantageously, the trolley 3000 is selectively moved (e.g., actuated to move) laterally (e.g., moves simultaneously with movement of the elevator cage 1410' relative to the base 1420') via a linear actuator (e.g., a hydraulic or pneumatic actuator) so that the cables or ribbons 1520 remain substantially vertical as the elevator cage 1410' moves laterally relative to the base 1420', such as to pick-up a block 1300 from a row or floor 1140 or to deliver a block 1300 to a row or floor 1140. Advantageously, this inhibits (e.g., prevents) the cables or ribbons 1520 from applying a tilting force or moment on the elevator cage assembly 1400' (e.g., on the elevator cage 1410') that may cause it to apply a force on guide rails of the frame or tower 1100, resulting in a lower load or stress on the guide rails during operation of the elevator cage assembly 1400' to pick-up or deliver a block 1300.

As shown in FIG. 9, the tower 1100 can have multiple modules in the Y or depth direction, each module having an elevator cage assembly 1400' that moves blocks 1300 between the floors 1140 of that module, and each module having a trolley 3000 over which one or more cables or ribbons 1520 extend, and each module having a lift drive system 2000' to which the cables or ribbons 1520 extend and then continue to the counterweight CW associated with the elevator cage assembly 1400' for that module. FIG. 10 shows two elevator cage assemblies 1400' in different modules, each connected to a separate associated counterweight CW, with their associated cable(s) or ribbon(s) 1520 extending over a separate associated trolley 3000 and toward the lift drive system 2000'. FIGS. 9-10 shows a right side of the system 1000. A left side of the system (not shown) can be a mirror image of the structure shown in FIGS. 9-10, so that the system 1000 has another set of trolleys 3000 (e.g., one for each module) and elevator cage assemblies 1400' (e.g., one for each module) on the left side of the tower or frame 1100 (e.g., each module has a trolley and elevator cage assembly 1400' on both the left side and the right side of the tower or frame 1100).

Figure 11:
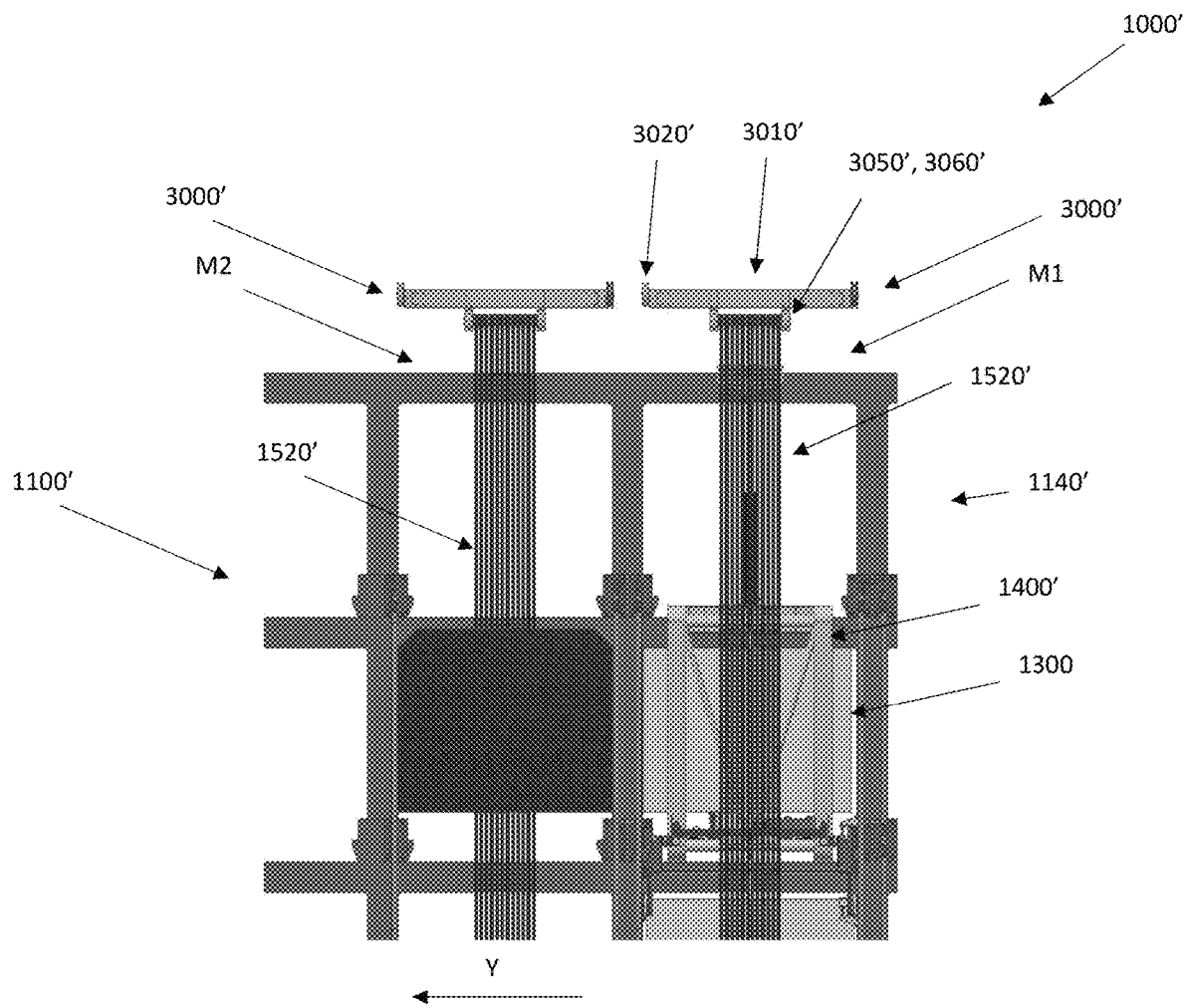
FIG. 11 is an end view of an upper portion of the tower in FIG. 9 showing a portion of a lift drive system.
Figure 12:
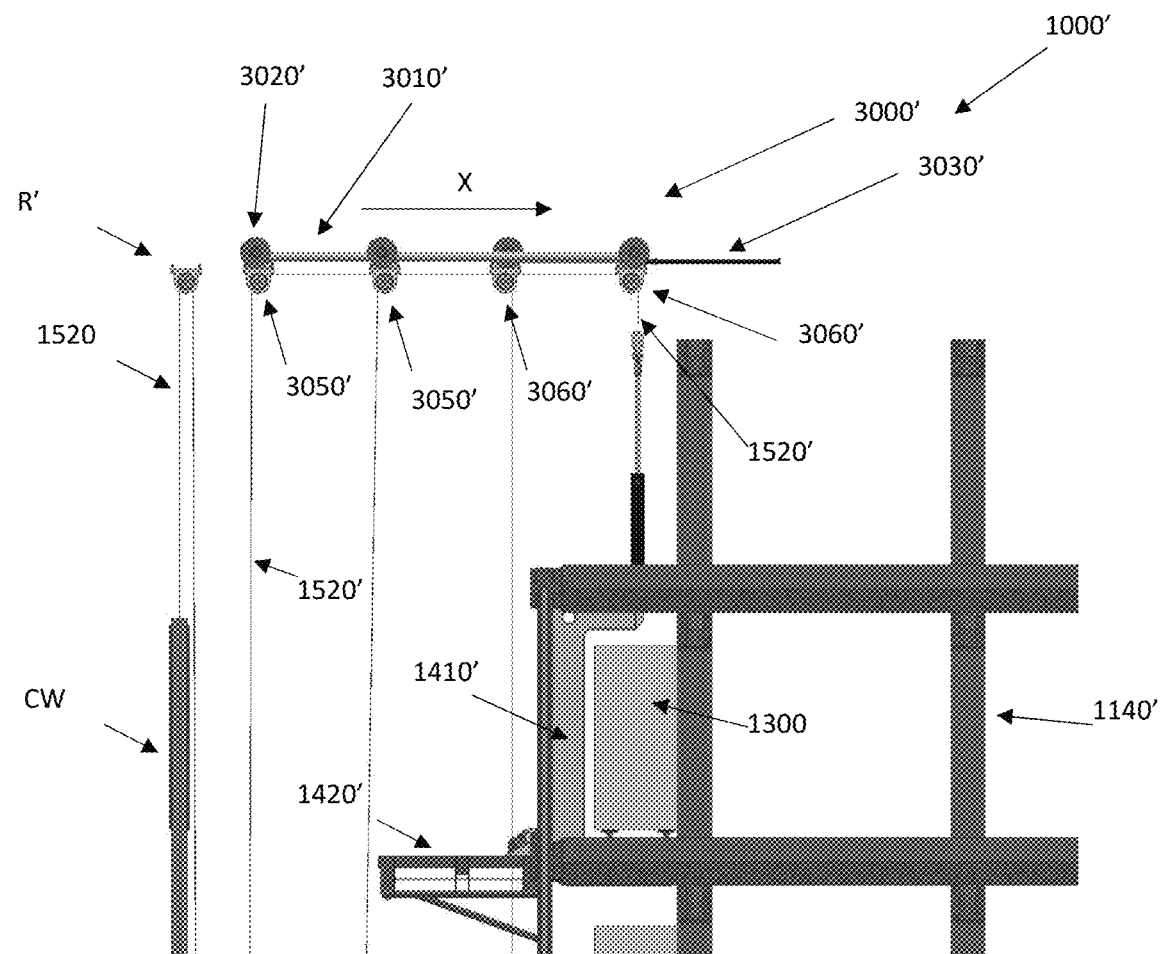
FIG. 12 is a schematic side view of an upper portion of the tower of FIG. 10 showing a portion of the lift drive system of FIG. 11.
Figure 13:
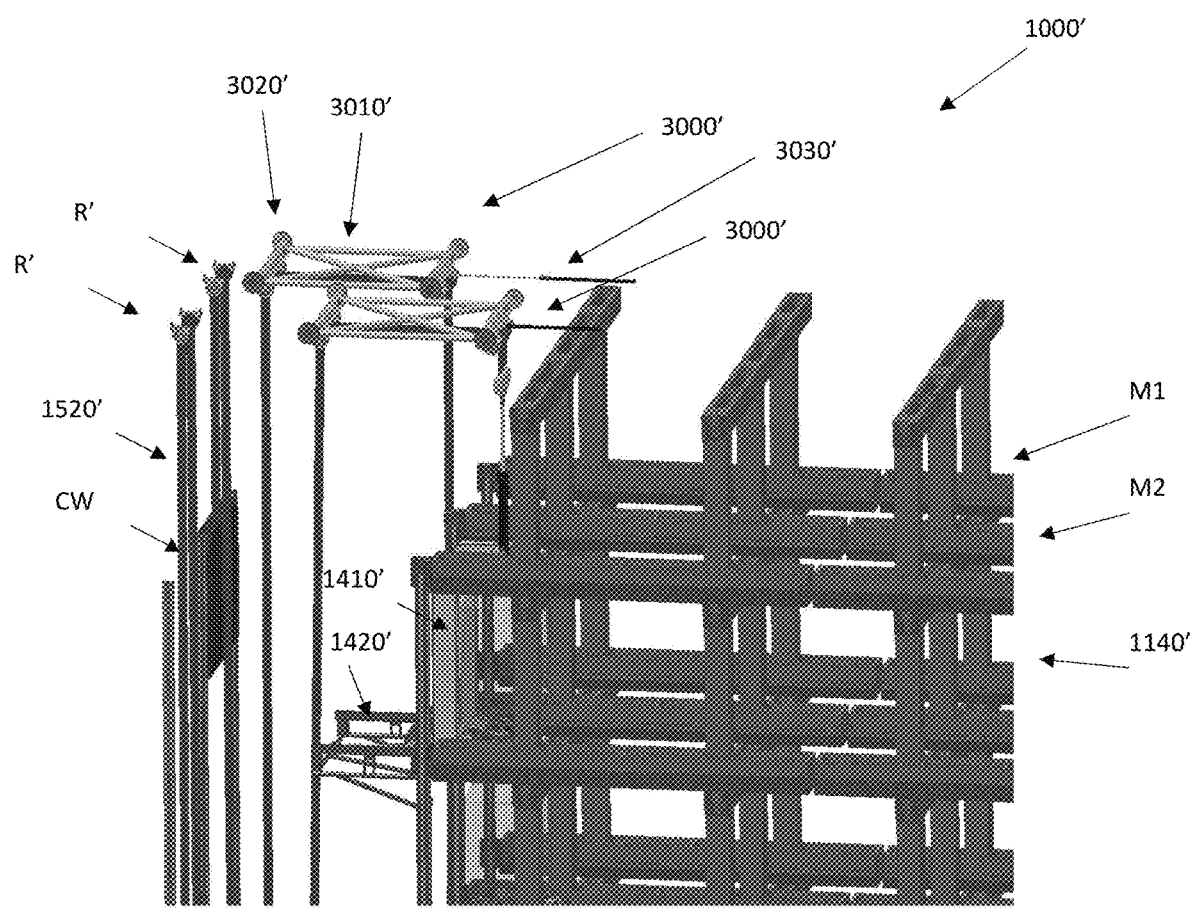
FIG. 13 is a schematic perspective view of an upper portion of the tower of FIG. 9 showing a portion of the lift drive system of FIG. 11.

FIGS. 11-15A shows partial views of a energy storage and delivery system 1000' for moving blocks 1300 (e.g., in a Z or vertical direction) between different rows or floors 1140' of a frame or tower 1100' with an elevator cage assembly 1400' with a lift drive system 2000'. The lift drive system 2000' is similar to the lift drive system 2000' in FIGS. 9-10 (e.g., has the same components), which is similar to the lift drive system 2000. Therefore, the reference numerals used to designate the various components of the lift drive system 2000' are identical to those used for identifying the corresponding components of the lift drive system 2000' in FIGS. 9-10. Therefore, the structure and description for the various features of the lift drive system 2000' and how it's operated and controlled in FIGS. 9-10 are understood to also apply to the corresponding features of the lift drive system 2000' in FIGS. 11-15, except as described below. The frame or tower 1100' can be similar (e.g., identical) to the frame or tower 1100 in FIGS. 9-10. For clarity, part of the frame or tower 1100' over which the trolleys 3000' move is excluded from these figures to illustrate components of the trolley 3000'. With reference to FIGS. 11-13, the portion of the frame or tower 1100' to which the roller R' for each module M1, M2 attaches is excluded. Though only two modules M1, M2 are shown for the frame or tower 1100', as discussed above, the frame or tower can have multiple modules (e.g., six modules, 12 modules in the depth or Y direction).

The system 1000' differs from the system 1000 in that the trolley 3000' has rollers 3050', 3060' disposed below a frame 3010' of the trolley 3000' over which the cables or ribbons 1520 extend. In another implementation, the rollers 3050', 3060' can be disposed above the frame 3010'. The trolley 3000' moves laterally along the frame or tower 1100' via wheels 3020' (e.g., four wheels 3020') attached to the frame 3010' (e.g., truss frame that rolls on rails or tracks on top of, or above the top floor 1140' of, the frame or tower 1100'). As discussed previously, the tower or frame 1100' can have multiple modules (e.g., in a Y or depth direction). As shown in FIG. 11, each module M1, M2 can have a separate trolley 3000' that moves over the top floor 1140' of the module M1, M2 of the tower 1100', and cables or ribbons 1520 extend over the rollers 3050', 3060' of each trolley 3000' and to associated elevator cage assembly 1400' and to a counterweight CW via its associated lift drive system 2000'. The trolley 3000' also has an actuator (e.g., a linear actuator, a hydraulic or pneumatic piston-cylinder assembly) 3030' that couples to the frame 3010' and can be actuated to move the trolley 3000' laterally over the frame or tower 1100' (e.g., to maintain the cables or ribbons 1520' substantially vertical during movement of the elevator cage 1410' relative to the base 1420'). For example, where the actuator 3030' is a piston-cylinder assembly 3030' (e.g., a hydraulic assembly), a piston can move within a cylinder of the piston cylinder assembly 3030' to move frame 3010' and therefore the trolley 3000' along the top of the tower 1100' (e.g., in X direction, as shown in FIG. 12).

Figure 14:
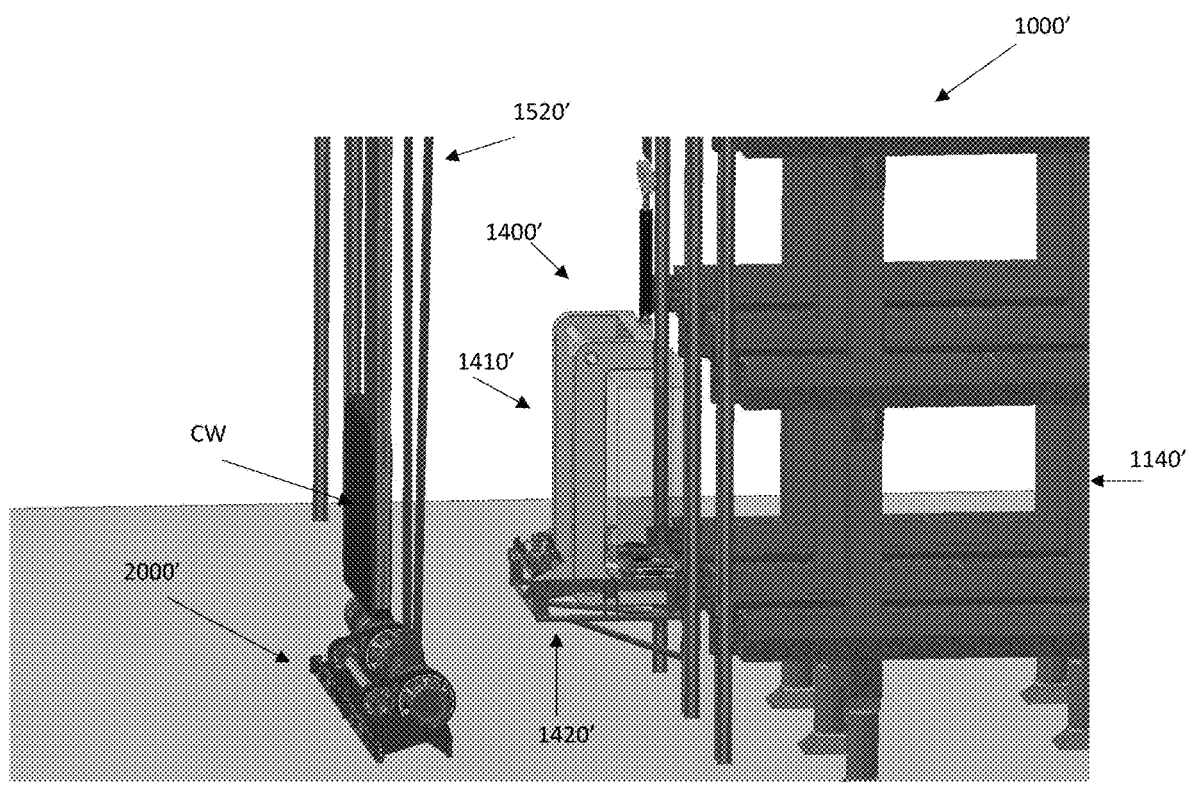
FIG. 14 is a schematic perspective view of a lower portion of the tower of FIG. 9 showing a portion of the lift drive system of FIG. 11.
Figure 15:
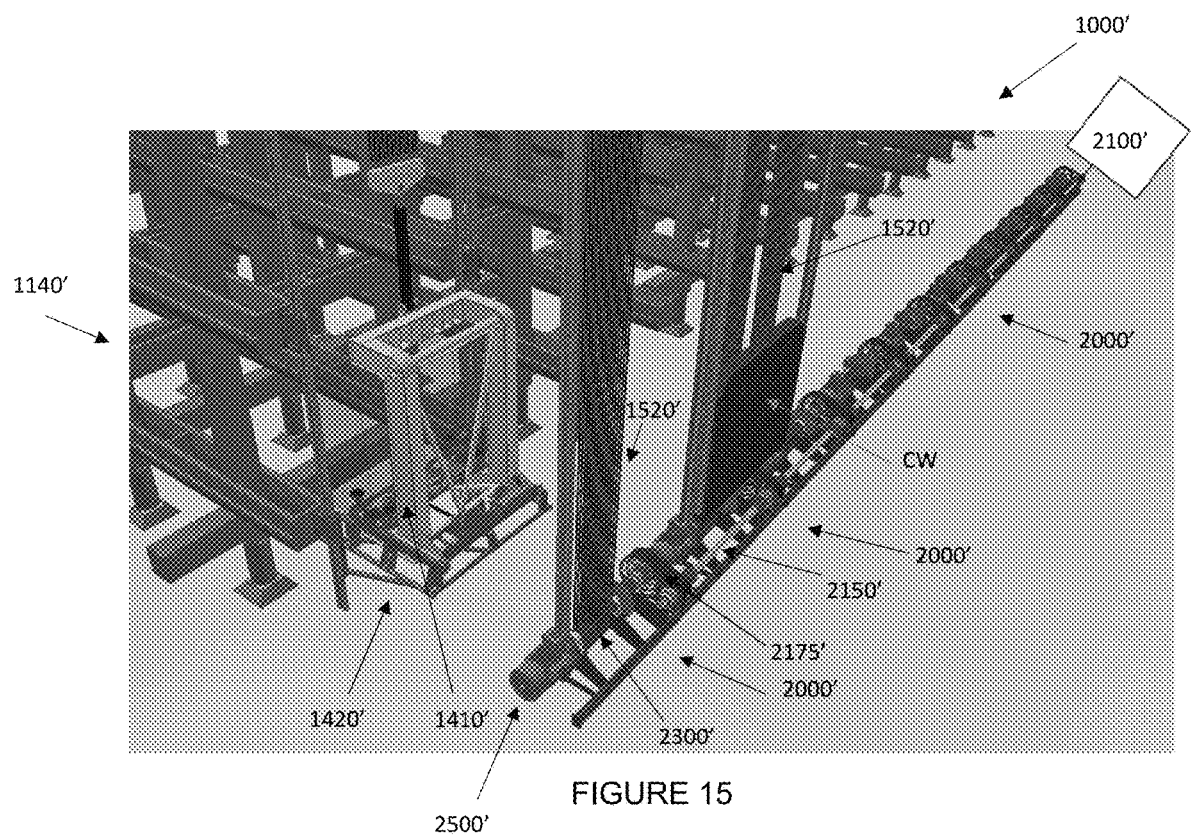
FIG. 15 is a schematic perspective view of a lower portion of the tower of FIG. 9 showing a portion of multiple lift drive systems of FIG. 11 for use with the tower.
Figure 15A:
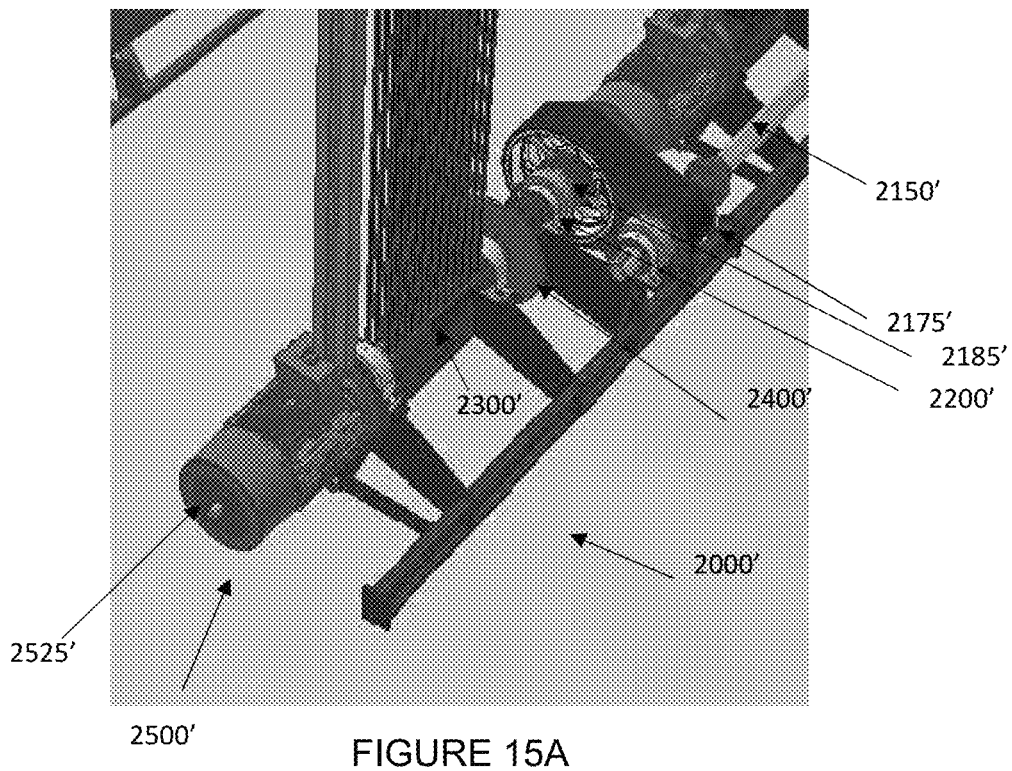
FIG. 15A is an enlarged view of the lift drive system in FIG. 15.

With reference to FIGS. 14-15A, the lift drive system 2000' for each module of the tower 1100' can be located on a ground level (e.g., at or below the bottom floor or row 1140') of the frame or tower 1100'. The lift drive system(s) 2000' can in one implementation be spaced apart and separate from the end of the frame or tower 1100'. In another implementation, the lift drive system(s) 2000' can be mounted or coupled on a bottom portion of the frame or tower 1100' (excluded from FIGS. 14-15). As shown in FIG. 15, the lift drive system(s) 2000' for each of the modules of the frame or tower 1100' can in one implementation be arranged in line with each other. Each lift drive system 2000' has an electric motor 2500' with an encoder 2525' that rotates a shaft 2300' (e.g., driven shaft) over which the cables or ribbons 1520 at least partially extend. In one implementation, the motor 2500' can be a 50 kW or 55 kW asynchronous electric motor and receive power from the electric grid. The motor 2500' can be operated to rotate the shaft 2300' in one direction to lift the elevator cage assembly 1400' (e.g., from one floor 1140' to another floor 1140') when it is empty (e.g., when it is not carrying a block 1300) and to rotate the shaft 2300' in an opposite direction to lower the elevator cage assembly 2300' (e.g., from one floor 1140' to another floor 1140') when it is empty (e.g., when it is not carrying a block). The motor 2500' does not operate when the elevator cage assembly 1400' is carrying a block 1300 (e.g., to lift the block 1300 or to lower the block 1300).

The lift drive system 2000' also includes a brake assembly 2400' selectively operable to brake a rotation of the shaft 2300' (e.g., to lock a position of the elevator cage assembly 1400'), for example when a block 1300 is being picked up by the elevator cate assembly 1400' from a row or floor 1140' or when a block 1300 is being unloaded from the elevator cage assembly 1400' onto a row or floor 1140'. The lift drive system 2000' also includes a clutch 2200' coupled to the shaft 2300' (e.g., via the brake assembly 2400'), and a roller 2185' (e.g., gear, pulley) coupled to the clutch 2200'. A belt 2175' connects the roller 2185' to a drive shaft 2150' (e.g., via a roller over which the belt 2175' extends). As shown in FIG. 15, the shaft 2150' extends to an electric motor 2100', so that operation of the electric motor 2100' rotates the drive shaft 2150' which can transfer rotational motion to the roller 2185' of each lift drive system 2000' (e.g., for each of the modules of the frame or tower 1100') via their associated belt 1175'. As shown in FIG. 15, the lift drive systems 2000' of all the modules on one side (e.g., a right side) of the frame or tower 1100' (e.g., all of the lift drive units) can be arranged in-line with each other. In one implementation, the electric motor 2100' can also be coupled to and rotate a drive shaft (e.g., like the drive shaft 2150') on an opposite side (e.g., a left side) of the frame or tower 1100' that is coupled to lift drive system 2000' for the modules on the left side of the frame or tower 1100'. The electric motor 2100 can be a 6.5 MW motor and can be a synchronous motor connected to the electrical grid.

With continued reference to FIGS. 14-15A, the system 1000' can be operated in a charging mode or discharging mode. When operated in a charging mode, the motor 2100' rotates the drive shaft 2150' in a direction so that it rotates the shaft 2300' (e.g., via the belt 2175' and roller 2185') when the clutch 2200' is engaged and the brake 2400' disengaged, causing the elevator cage assembly 1400' to be lifted (e.g., while carrying a block 1300 from a lower row or floor 1140' to a higher row or floor 1140'). The clutch 2200' is selectively disengaged for the lift drive system 2000' (e.g., of a particular module of the frame or tower 1100') to disconnect the rotation of the drive shaft 2150' from the shaft 2300' (e.g., to allow the motor 2500' to move the elevator cage assembly 1400' while empty between floors 1140').

With reference to FIG. 15, when the system 1000' is operated in the charging mode (e.g., in the morning, at noon), the clutch 2200' of the lift drive systems 2000' for the different modules in the depth direction (e.g., Y direction) of the frame or tower 1100' can be operated to stagger the movement (e.g., lifting) of the elevator cage assemblies 1400' of the different modules by the motor 2100' by a predetermined time period (e.g., four seconds). In one example, the lift drive system 2000' of a first module of the frame or tower 1100' can engage the clutch 2200' to allow rotation of the drive shaft 2150' by the motor 2100' to lift its associated elevator cage assembly 1400' (e.g., carrying a block 1300) to a higher elevation. Four seconds later, at which time the first elevator cage assembly 1400' has reached its floor 1140' destination, the clutch 2200' of the lift drive system 2000' for the next module (e.g., the adjacent module) can engage to allow the lifting of its associated elevator cage assembly 1400', and so on.

When the system 1000' is operated in a discharging mode, the phase of the electric motor 2100' is switched so that the drive shaft 2150' is rotated in the opposite direction, and the clutches 2200' of the lift drive systems 2000' for the various modules of the tower or frame 1100' can also be selectively actuated to stagger the movement (e.g., lowering) of the elevator cage assemblies 1400' of the different modules by the motor 2100' by a predetermined time period (e.g., four seconds). The same example above for operating the clutch 2200' of the lift drive systems 2000' for lifting the elevator cage assemblies 1400' of the modules can apply for lowering the elevator cage assemblies 1400' (e.g., while carrying a block 1300). As the elevator cage assembly 1400' is lowered, the electric motor 2100' generates electricity (e.g., by slowing down the speed at which the elevator cage assembly 1400' is lowered—so that it is not in free fall) and delivers the electricity to the electric grid.

As discussed above, the frame or tower 1100' of the system 1000' can have elevator cage assemblies 1400' on a left side and a right side for each module of the frame or tower 1100', each with associated trolleys 3000' and lift drive systems 2000'. Just as the operation of the lift drive systems 2000' can be staggered on one side (as described above), the operation of the lift drive system 2000/ on the opposite side of the frame or tower 1100' can also be staggered. Additionally, for each module, the operation of the lift drive system 2000' and associated elevator cage assembly 1400' on one side of the frame or tower 1100' can be the inverse or opposite of that on the other side of the frame or tower 1100'. For example, for each module of the frame or tower 1100, when the elevator cage 1400' on one side is arriving at an upper floor (e.g., empty to pick up a block or carrying a block to unload the block), the elevator cage 1400' on the other side is arriving at a lower floor (e.g., empty to pick up a block or carrying a block to unload the block).

Figure 16A:
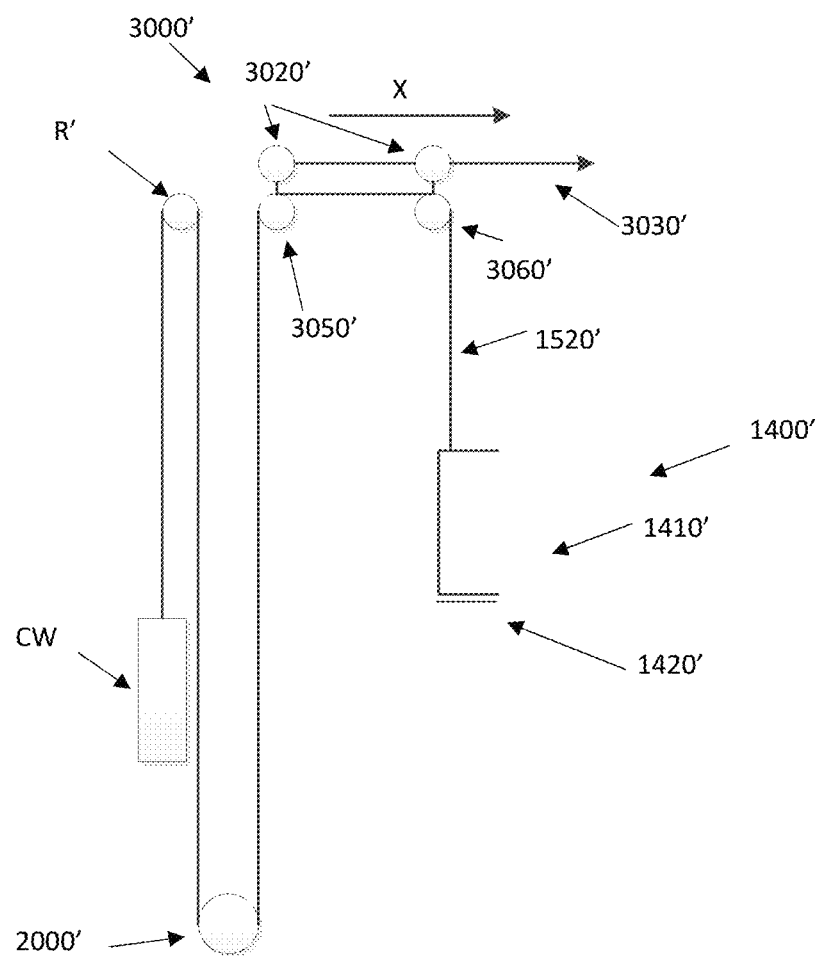
FIG. 16A is a schematic side view of the lift drive system in FIGS. 11-15 in one operating position.
Figure 16B:
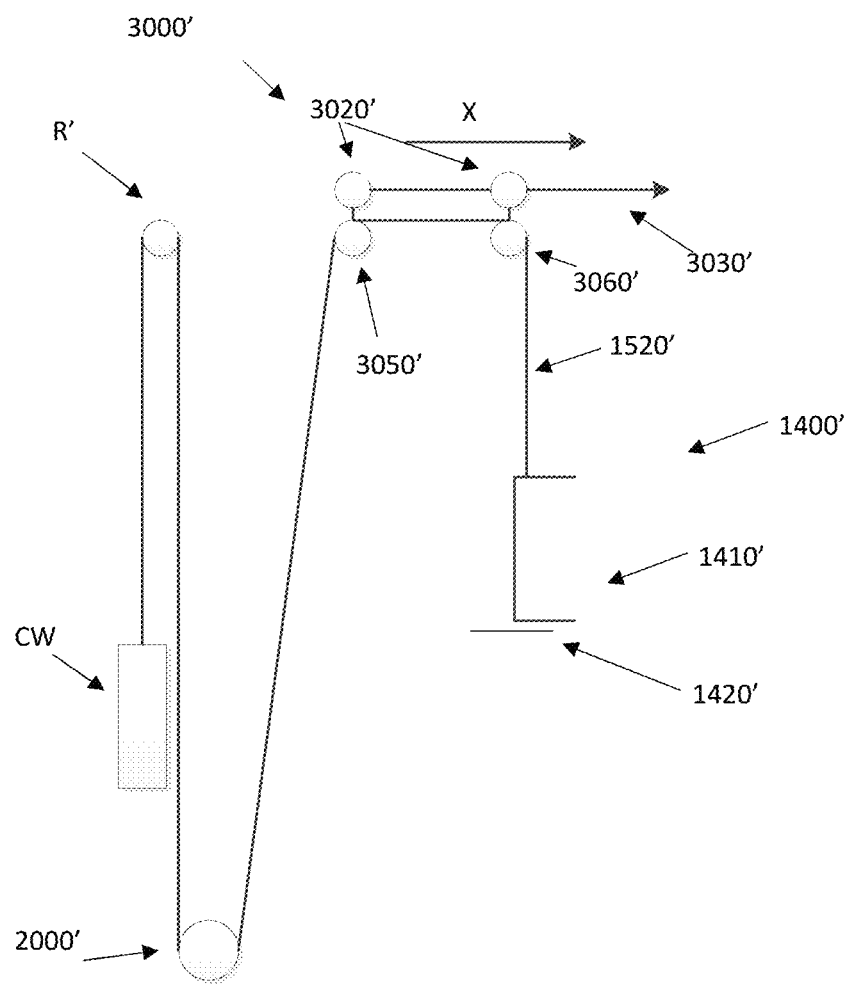
FIG. 16B is a schematic side view of the lift drive system in FIGS. 11-15 in another operating position.

FIGS. 16A-16B show schematic views of the lift drive system 2000' and trolley 3000' for one module of the frame or tower of the system 1000' in two different positions. As shown in FIG. 16A, the cable(s) or ribbon(s) 1520' extend from the counterweight CW, up toward and over the roller R', down toward and around the lift drive system 2000' (e.g., around the shaft 2300' of the lift drive system 2000'. The cable(s) or ribbon(s) 1520' then extend up toward the trolley 3000' and at least partially over the rollers 1350', 1360', after which the cable(s) or ribbon(s) 1520' extend down to the elevator cage assembly 1400' (e.g., to the elevator cage 1410' of the elevator cage assembly 1400'). In FIG. 16A, the elevator cage assembly 1400' is in the retracted position (e.g., with the elevator cage 1410' over the base 1420'), such as when moving up and down between floors 1140' (e.g., empty or while carrying a block 1300). In FIG. 16B, the elevator cage assembly 1400' is in the extended position (e.g., with the elevator cage 1410' extended relative to the base 1420'), such as when the elevator cage 1410' has moved toward the row or floor 1140' to pick up or drop off a block 1300. As the elevator cage 1410' moves relative to the base 1420', the trolley 3000' is actuated (e.g., by the linear actuator 3030') to move laterally (in the X direction) so as to maintain the cable(s) or ribbon(s) between the roller 1360' and the elevator cage assembly 1400' vertical (e.g., to advantageously inhibit or prevent the cables or ribbons 1520' from applying a tilting force or moment on the elevator cage assembly 1400' that may cause it to apply a force on guide rails of the frame or tower).

Figure 17:
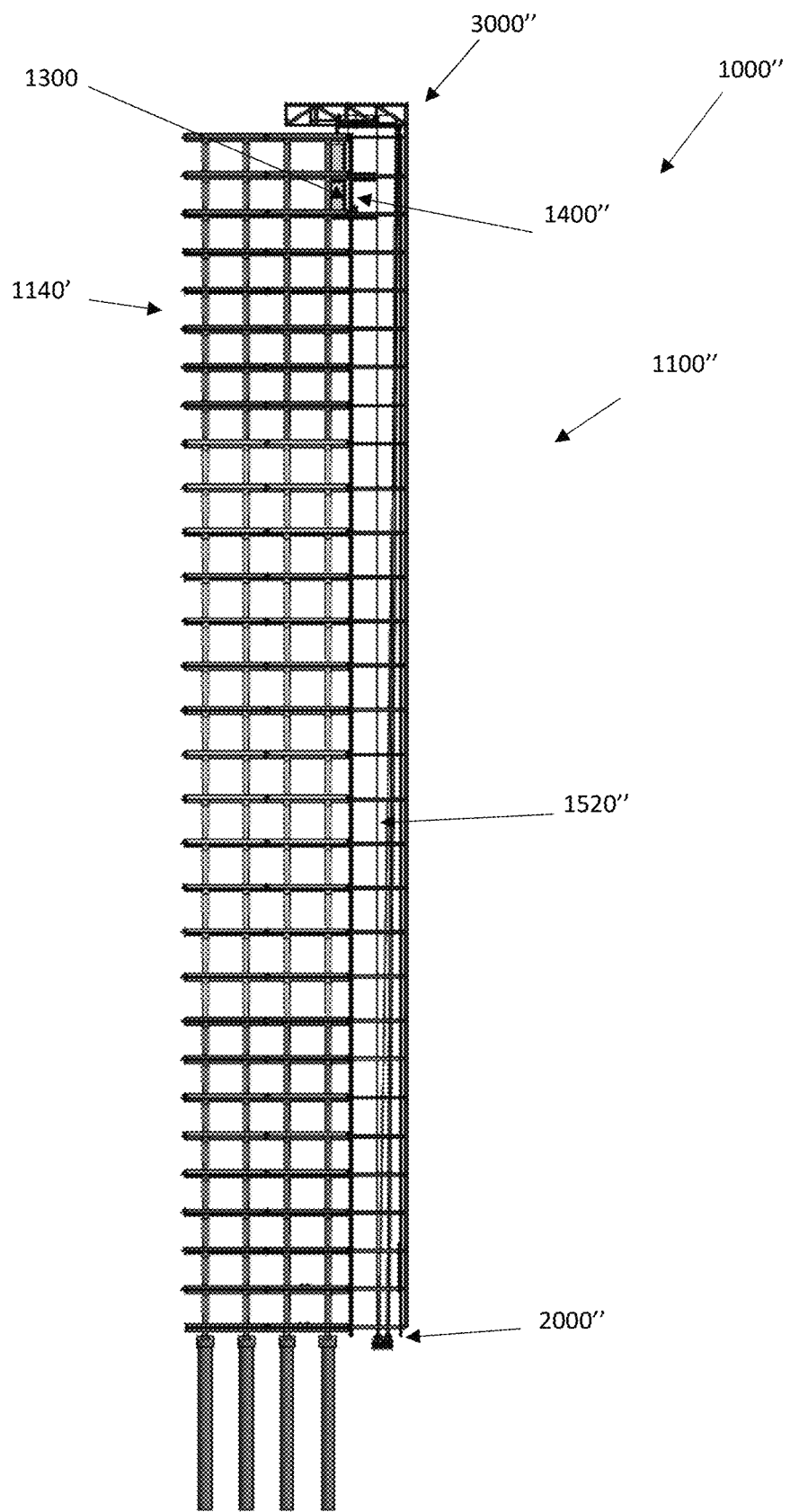
FIG. 17 is a schematic side view of the tower or frame with a lift drive system.
Figure 18A:
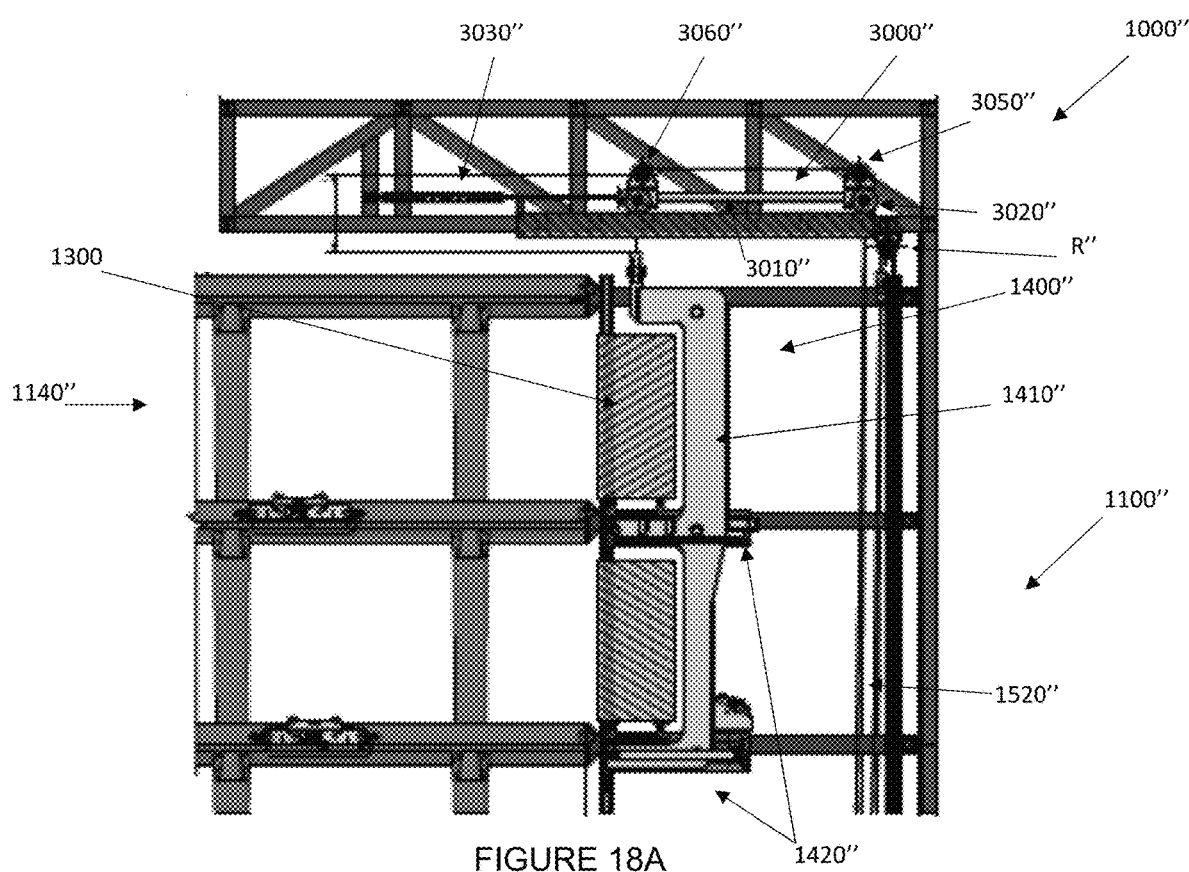
FIG. 18A is a schematic side view of an upper portion of the tower or frame in FIG. 17 with the elevator assembly in one position.
Figure 18B:
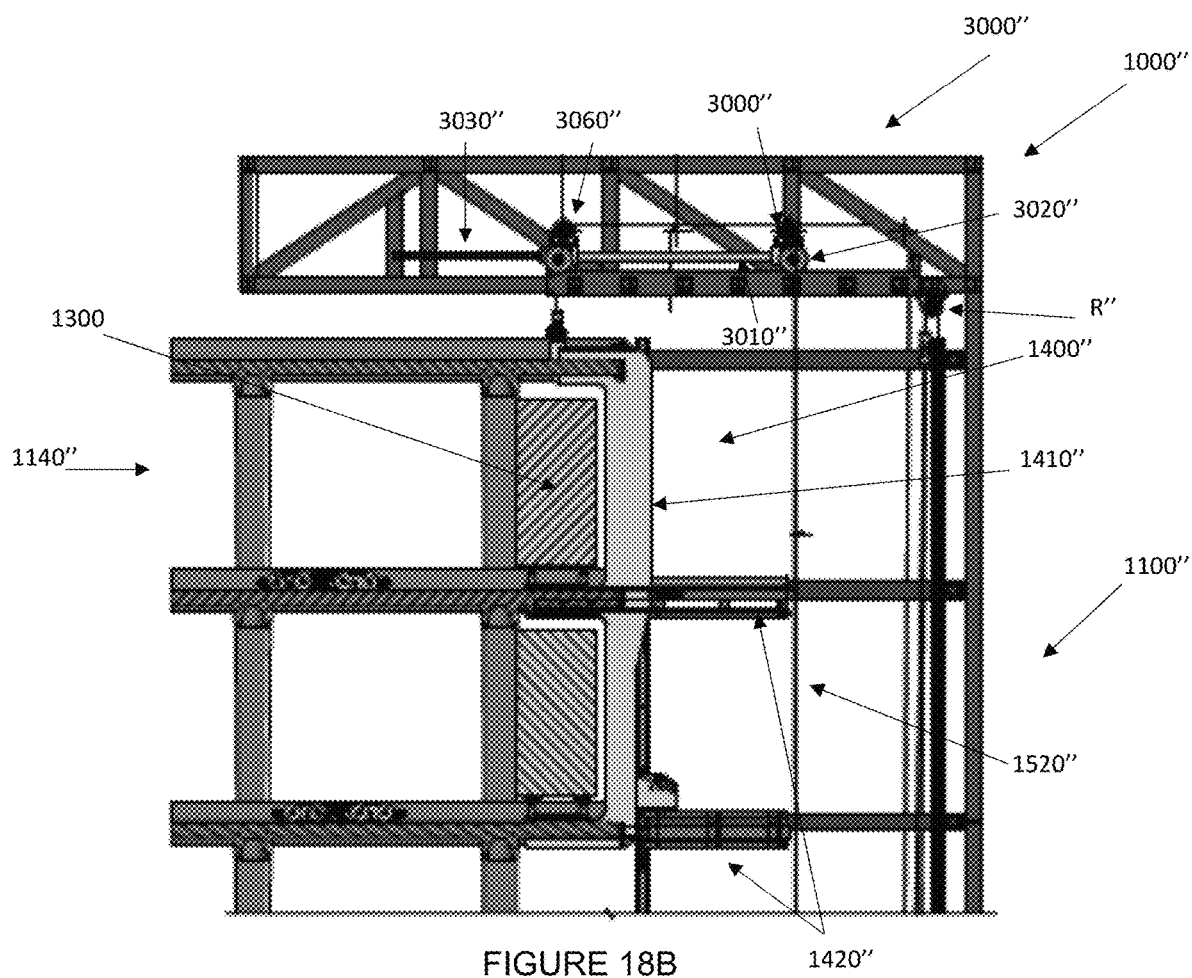
FIG. 18B is a schematic side view of an upper portion of the tower or frame in FIG. 17 with the elevator assembly in another position.
Figure 19:
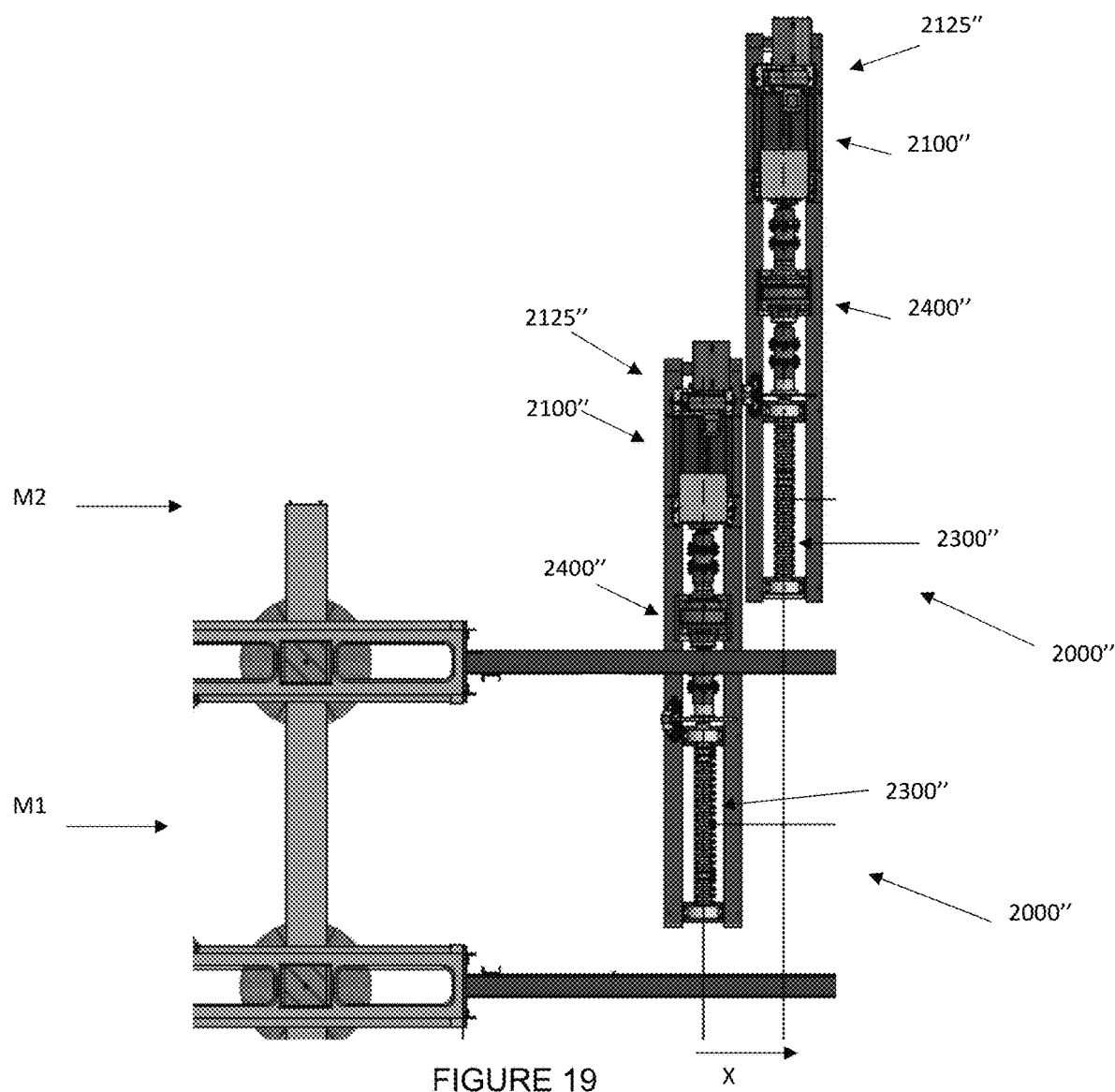
FIG. 19 is a schematic top view of a portion of the lift drive system of FIG. 17 for the tower or frame.

FIGS. 17-19 show an energy storage and delivery system 1000" for moving blocks 1300 (e.g., in a Z or vertical direction) between different rows or floors 1140" of a frame or tower 1100" with a trolley 3000" and an elevator cage assembly 1400" using a lift drive system 2000". The system 1000", frame or tower 1100", trolley 3000", elevator cage assembly 1400" and lift drive system 2000" are similar to the system 1000, 1000', frame or tower 1100, 1100', trolley 3000, 3000', elevator cage assembly 1400' and lift drive system 2000' described above for FIGS. 9-16B. Therefore, the reference numerals used to designate the various components of the system 1000", frame or tower 1100", trolley 3000", elevator cage assembly 1400" and lift drive system 2000" are identical to those used for identifying the corresponding components of the system 1000, 1000', frame or tower 1100, 1100', trolley 3000, 3000', elevator cage assembly 1400" and lift drive system 2000' in FIGS. 11-16B, except that the numerical identifiers end in an " " ". Therefore, the structure and description for the various features of the system 1000, 1000', frame or tower 1100, 1100', trolley 3000, 3000', elevator cage assembly 1400" and lift drive system 2000' in FIGS. 11-16B and how they are operated and controlled are understood to also apply to the corresponding features of the system 1000", frame or tower 1100", trolley 3000", elevator cage assembly 1400" and lift drive system 2000" in FIGS. 17-19, except as described below.

The trolley 3000" differs from the trolley 3000' in that the rollers 3050", 3060" over which the cable(s) or ribbon(s) 1520" extend are disposed above (not below) the frame 3010" of the trolley 3000". The elevator cage assembly 1400" differs from the elevator cage assembly 1400' in that it has an elevator cage 1410" that can pick up, transport (e.g., up or down on the frame or tower 1100") and deliver two blocks 1300 simultaneously to two adjacent vertical rows or floors 1140" (e.g., in the same module of the frame or tower 1100"). The base 1420" of the elevator cage assembly 1400" can be two bases, as shown in FIGS. 18A, 18B, relative to which the elevator cage 1410" can laterally move (e.g., toward or away from ends of the rows or floors 1140"). As discussed above, though the frame or tower 1100" only shows a trolley 3000", elevator cage assembly 1400" and lift drive system 2000" on a right side of the system 1000", the frame or tower 1100" of the system 1000" can have elevator cage assemblies 1400" on a left side for each module of the frame or tower 1100", each with associated trolleys 3000" and lift drive systems 2000". The structure of the left side of the frame or tower 1100" can be a mirror image of the structure shown in FIG. 17.

The lift drive system 2000" differs from the lift drive system 2000, 2000' in that the lift drive system 2000" (or lift drive unit) for adjacent modules M1, M2 are offset (i.e., not in-line) with each other in the X direction. The lift drive system 2000" (for each module in the frame or tower 1100") excludes a clutch and has a motor 2100" that operates using a variable frequency drive 2125" to raise or lower the associated elevator cage assembly 1400" (whether empty or carrying block(s) 1300) between the rows or floors 1140" of the frame or tower 1100" (e.g., by rotating the driven shaft 2300"). Therefore, one motor 2100" is used in the lift drive system 2000" to lift or lower the associated elevator cage assembly 1400" (e.g., via the cables or ribbons 1520" by switching the rotation direction of the shaft of the motor 2100"), whether empty or carrying block(s) 1300. The motor 2100" generates electricity (that can be transferred to the electric grid) when the elevator cage assembly 1400" carrying block(s) 1300 is lowered from a higher floor 1140" to a lower floor 1140" of the frame or tower 1100", in the same manner discussed above for motor 2100' (e.g., by slowing down the speed at which the elevator cage assembly 1400" is lowered—so that it is not in free fall). In one implementation, the motor 2100" can be a 1 MW electric motor-generator.

Additional Embodiments

In embodiments of the present invention, a lift drive system for an energy storage system, a method of operating the same, may be in accordance with any of the following clauses:

Clause 1: A lift drive system for an energy storage and delivery system, comprising:
an electric motor having an output shaft;
a clutch coupled to the output shaft;
a driven shaft coupled to the clutch;
a steel ribbon disposed at least partially about and in contact with the driven shaft, rotation of the driven shaft causing the steel ribbon to translate; and
a brake assembly operatively coupled to the driven shaft and selectively operable to brake a rotation of the driven shaft,
wherein when the clutch is engaged, rotation of the output shaft rotates the driven shaft in a first direction to translate the steel ribbon, and wherein when the clutch is disengaged, rotation of the output shaft does not rotate the driven shaft and the brake assembly is engaged to maintain a position of the driven shaft and the steel ribbon.

Clause 2: The system of claim 1, wherein the brake assembly comprises:

a disc disposed about and coupled with the driven shaft so that the disc and driven shaft rotate together, and a brake pad assembly selectively engageable with the disc to inhibit rotation of the disc and thereby rotation of the driven shaft.

Clause 3: The system of clause 1, wherein the electric motor constantly operates on power from an electrical grid to rotate the output shaft in one direction.

Clause 4: The system of any preceding clause, wherein at least a portion of the driven shaft that engages the steel ribbon is coated with polyurethane.

Clause 5: The system of any preceding clause, wherein driven shaft has a first portion and a second portion, the brake assembly disposed between the first portion and the second portion, the first portion and second portion each configured to engage a steel ribbon.

Clause 6: The system of any preceding clause, wherein one portion of the steel ribbon on one side of the driven shaft is coupled to an elevator cage assembly configured to receive a block therein for lifting the block from a lower elevation to a higher elevation, and wherein another portion of the steel ribbon on an opposite side of the driven shaft is coupled to a counterweight, wherein rotation of the driven shaft in a first direction causes the steel ribbon to translate to raise the elevator cage assembly and simultaneously lower the counterweight.

Clause 7: The system of clause 6, further comprising a second electric motor coupled to an end of the driven shaft opposite from the electric motor, the second electric motor operable to rotate the driven shaft in a second direction opposite the first direction once the elevator cage assembly has reached the higher elevation, and after the clutch has been disengaged to decouple the output shaft from the driven shaft and once the brake assembly has been disengaged to allow rotation of the driven shaft by the second electric motor.

Clause 8: The system of any preceding clause, further comprising a second output shaft extending from an opposite end of the electric motor, a second clutch coupled to the second output shaft, a second driven shaft coupled to the second clutch, a second steel ribbon disposed at least partially about and in contact with the second driven shaft, rotation of the second driven shaft causing the second steel ribbon to translate, and a second brake assembly operatively coupled to the second driven shaft, wherein when the second clutch is engaged, rotation of the second output shaft rotates the second driven shaft in the first direction to translate the second steel ribbon, and wherein when the second clutch is disengaged, rotation of the second output shaft does not rotate the second driven shaft and the second brake assembly is engaged to maintain the position of the second driven shaft and the second steel ribbon.

Clause 9: The system of clause 8, wherein one portion of the second steel ribbon on one side of the second driven shaft is coupled to a second elevator cage assembly configured to receive a block therein for lifting the block from a lower elevation to a higher elevation, and wherein another portion of the second steel ribbon on an opposite side of the second driven shaft is coupled to a second counterweight, wherein rotation of the second driven shaft in a first direction causes the second steel ribbon to translate to raise the second elevator cage assembly to a higher elevation and simultaneously lower the second counterweight to a lower elevation.

Clause 10: The system of clause 9, further comprising a third electric motor coupled to an end of the second driven shaft opposite from the electric motor, the third electric motor operable to rotate the second driven shaft in a second direction opposite the first direction once the second elevator cage assembly has reached the higher elevation, and after the second clutch has been disengaged to decouple the second output shaft from the second driven shaft and once the second brake assembly has been disengaged to allow rotation of the second driven shaft.

Clause 11: A lift drive system for an energy storage and delivery system, comprising:

one or more lift drive units comprising:

an electric motor coupled to a driven shaft and operable to rotate the driven shaft, a steel ribbon disposed at least partially about and in contact with the driven shaft, rotation of the driven shaft causing the steel ribbon to translate, a brake assembly operatively coupled to the driven shaft and selectively operable to brake a rotation of the driven shaft, a clutch coupled to the driven shaft, the brake assembly disposed between the clutch and the electric motor, and a roller coupled to the clutch, the clutch disposed between the brake assembly and the roller, the electric motor, brake assembly, clutch and roller arranged in-line;

a drive shaft offset from the roller and coupled to the roller by a belt so that rotation of the drive shaft causes rotation of the roller in a same direction via the belt; and a second electric motor coupled to the drive shaft and operable to rotate the drive shaft, wherein when the clutch is engaged, the brake assembly disengaged and the electric motor off, rotation of the drive shaft by the second electric motor causes rotation of the roller and the driven shaft in a first direction to translate the steel ribbon, and wherein when the clutch is disengaged, rotation of the drive shaft does not rotate the driven shaft and the brake assembly is engaged to maintain a position of the driven shaft and the steel ribbon.

Clause 12: The system of clause 11, wherein the one or more lift drive units is a plurality of lift drive units arranged in-line with each other.

Clause 13: The system of clause 11, wherein the electric motor comprises an encoder.

Clause 14: The system of clause 11, wherein the electric motor is approximately a 55 kW asynchronous electric motor.

Clause 15: The system of clause 11, wherein the second electric motor is a synchronous electric motor that constantly operates on power from an electrical grid to rotate the drive shaft in one direction.

Clause 16: The system of clause 15, wherein the second electric motor is approximately a 6.5 MW electric motor.

Clause 17: A lift drive system for an energy storage and delivery system, comprising:

one or more lift drive units comprising:

an electric motor coupled to a driven shaft, a variable frequency drive operatively coupled to the electric motor, a steel ribbon disposed at least partially about and in contact with the driven shaft, rotation of the driven shaft by the electric motor causing the steel ribbon to translate, and a brake assembly operatively coupled to the driven shaft and selectively operable to brake a rotation of the driven shaft, wherein when the brake assembly is disengaged, rotation of the driven shaft by the electric motor in a first direction causes a linear movement of the steel ribbon in one direction, and wherein rotation of the driven shaft by the electric motor in a second direction opposite the first direction causes a linear movement of the steel ribbon in an opposite direction, and wherein when the brake assembly is engaged a position of the driven shaft and the steel ribbon is maintained.

Clause 18: The system of clause 17, wherein the one or more lift drive units is a plurality of lift drive units, each of the lift drive units offset from and extending at least partially parallel to another of the lift drive units.

Clause 19: The system of clause 11, wherein the electric motor is approximately a 1 MW electric motor.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A lift drive system for an energy storage and delivery system, comprising:
   an electric motor having an output shaft;
   a clutch coupled to the output shaft;
   a driven shaft coupled to the clutch;
   a steel ribbon disposed at least partially about and in contact with the driven shaft, rotation of the driven shaft causing the steel ribbon to translate; and
   a brake assembly operatively coupled to the driven shaft and selectively operable to brake the rotation of the driven shaft,
   wherein when the clutch is engaged, rotation of the output shaft rotates the driven shaft in a first direction to translate the steel ribbon, and wherein when the clutch is disengaged, rotation of the output shaft does not rotate the driven shaft and the brake assembly is engaged to maintain a position of the driven shaft and the steel ribbon.

2. The system of claim 1, wherein the brake assembly comprises:
   a disc disposed about and coupled with the driven shaft so that the disc and the driven shaft rotate together, and
   a brake pad assembly selectively engageable with the disc to inhibit rotation of the disc and thereby rotation of the driven shaft.

3. The system of claim 1, wherein the electric motor constantly operates on power from an electrical grid to rotate the output shaft in one direction.

4. The system of claim 1, wherein at least a portion of the driven shaft that engages the steel ribbon is coated with polyurethane.

5. The system of claim 1, wherein the driven shaft has a first portion and a second portion, the brake assembly disposed between the first portion and the second portion, the first portion and the second portion each configured to engage the steel ribbon.

6. The system of claim 1, wherein one portion of the steel ribbon on one side of the driven shaft is coupled to an elevator cage assembly configured to receive a block therein for lifting the block from a lower elevation to a higher elevation, and wherein another portion of the steel ribbon on an opposite side of the driven shaft is coupled to a counterweight, wherein rotation of the driven shaft in the first direction causes the steel ribbon to translate to raise the elevator cage assembly and simultaneously lower the counterweight.

7. The system of claim 6, further comprising a second electric motor coupled to an end of the driven shaft opposite from the electric motor, the second electric motor operable to rotate the driven shaft in a second direction opposite the first direction once the elevator cage assembly has reached the higher elevation, and after the clutch has been disengaged to decouple the output shaft from the driven shaft and once the brake assembly has been disengaged to allow rotation of the driven shaft by the second electric motor.

8. The system of claim 1, further comprising a second output shaft extending from an opposite end of the electric motor, a second clutch coupled to the second output shaft, a second driven shaft coupled to the second clutch, a second steel ribbon disposed at least partially about and in contact with the second driven shaft, rotation of the second driven shaft causing the second steel ribbon to translate, and a second brake assembly operatively coupled to the second driven shaft, wherein when the second clutch is engaged, rotation of the second output shaft rotates the second driven shaft in the first direction to translate the second steel ribbon, and wherein when the second clutch is disengaged, rotation of the second output shaft does not rotate the second driven shaft and the second brake assembly is engaged to maintain the position of the second driven shaft and the second steel ribbon.

9. The system of claim 8, wherein one portion of the second steel ribbon on one side of the second driven shaft is coupled to a second elevator cage assembly configured to receive a block therein for lifting the block from a lower elevation to a higher elevation, and wherein another portion of the second steel ribbon on an opposite side of the second driven shaft is coupled to a second counterweight, wherein rotation of the second driven shaft in the first direction causes the second steel ribbon to translate to raise the second elevator cage assembly to the higher elevation and simultaneously lower the second counterweight to the lower elevation.

10. The system of claim 9, further comprising a third electric motor coupled to an end of the second driven shaft opposite from the electric motor, the third electric motor operable to rotate the second driven shaft in a second direction opposite the first direction once the second elevator cage assembly has reached the higher elevation, and after the second clutch has been disengaged to decouple the second output shaft from the second driven shaft and once the second brake assembly has been disengaged to allow rotation of the second driven shaft.

11. A lift drive system for an energy storage and delivery system, comprising:
   one or more lift drive units comprising:
      an electric motor coupled to a driven shaft and operable to rotate the driven shaft,
      a steel ribbon disposed at least partially about and in contact with the driven shaft, rotation of the driven shaft causing the steel ribbon to translate,
      a brake assembly operatively coupled to the driven shaft and selectively operable to brake a rotation of the driven shaft,
      a clutch coupled to the driven shaft, the brake assembly disposed between the clutch and the electric motor,
      a roller coupled to the clutch, the clutch disposed between the brake assembly and the roller, the electric motor, the brake assembly, the clutch and the roller arranged in-line;
   a drive shaft offset from the roller and coupled to the roller by a belt so that rotation of the drive shaft causes rotation of the roller in a same direction via the belt; and
   a second electric motor coupled to the drive shaft and operable to rotate the drive shaft,
   wherein when the clutch is engaged, the brake assembly disengaged and the electric motor off, rotation of the drive shaft by the second electric motor causes rotation of the roller and the driven shaft in a first direction to translate the steel ribbon, and wherein when the clutch is disengaged, rotation of the drive shaft does not rotate the driven shaft and the brake assembly is engaged to maintain a position of the driven shaft and the steel ribbon.

12. The system of claim 11, wherein the one or more lift drive units is a plurality of lift drive units arranged in-line with each other.

13. The system of claim 11, wherein the electric motor comprises an encoder.

14. The system of claim 11, wherein the electric motor is approximately a 55 kW asynchronous electric motor.

15. The system of claim 11, wherein the second electric motor is a synchronous electric motor that constantly operates on power from an electrical grid to rotate the drive shaft in one direction.

16. The system of claim 15, wherein the second electric motor is approximately a 6.5 MW electric motor.

17. A lift drive system for an energy storage and delivery system, comprising:
   one or more lift drive units comprising:
      an electric motor coupled to a driven shaft,
      a variable frequency drive operatively coupled to the electric motor,
      a steel ribbon disposed at least partially about and in contact with the driven shaft, rotation of the driven shaft by the electric motor causing the steel ribbon to translate, and
      a brake assembly operatively coupled to the driven shaft and selectively operable to brake a rotation of the driven shaft,
   wherein when the brake assembly is disengaged, rotation of the driven shaft by the electric motor in a first direction causes a linear movement of the steel ribbon in one direction, and wherein rotation of the driven shaft by the electric motor in a second direction opposite the first direction causes a linear movement of the steel ribbon in an opposite direction, and wherein when the brake assembly is engaged a position of the driven shaft and the steel ribbon is maintained.

18. The system of claim 17, wherein the one or more lift drive units is a plurality of lift drive units, each of the plurality of lift drive units offset from and extending at least partially parallel to another one of the plurality of lift drive units.

19. The system of claim 17, wherein the electric motor is approximately a 1 MW electric motor.

* * * * *